(12) United States Patent
Bergmann et al.

(10) Patent No.: US 9,764,327 B2
(45) Date of Patent: Sep. 19, 2017

(54) CONVEYING ARRANGEMENT WITH KNIVES WHICH CAN BE PIVOTED VERTICALLY AND SHIFTED LATERALLY

(71) Applicant: FORAGE INNOVATIONS B.V., Maassluis (NL)

(72) Inventors: Thomas Bergmann, Maassluis (NL); Konstantinos Amanatidis, Maassluis (NL); Sebastian Fricke, Maassluis (NL)

(73) Assignee: FORAGE INNOVATIONS B.V., Maassluis (NL)

( * ) Notice: Subject to any disclaimer, the term of this patent is extended or adjusted under 35 U.S.C. 154(b) by 0 days.

(21) Appl. No.: 14/769,813

(22) PCT Filed: Feb. 14, 2014

(86) PCT No.: PCT/NL2014/050091
§ 371 (c)(1),
(2) Date: Aug. 22, 2015

(87) PCT Pub. No.: WO2014/129892
PCT Pub. Date: Aug. 28, 2014

(65) Prior Publication Data
US 2016/0001294 A1  Jan. 7, 2016

(30) Foreign Application Priority Data

Feb. 22, 2013  (NL) .................................... 2010354

(51) Int. Cl.
*A01D 43/02* (2006.01)
*A01D 87/00* (2006.01)
(Continued)

(52) U.S. Cl.
CPC ............ *B02C 13/286* (2013.01); *A01D 41/12* (2013.01); *A01D 61/00* (2013.01); *A01D 90/04* (2013.01);
(Continued)

(58) Field of Classification Search
CPC .......... A01F 2015/107; A01F 2015/108; A01F 15/106; A01F 15/10; A01F 2015/102;
(Continued)

(56) References Cited

U.S. PATENT DOCUMENTS 5,974,776 A * 11/1999 Prellwitz ................ A01D 90/04
460/112
6,298,646 B1 * 10/2001 Schrag .................. A01F 15/101
100/88

(Continued)

FOREIGN PATENT DOCUMENTS

DE       93 08 656.3 U1    8/1993
DE       37 11 355 C1      4/1998
(Continued)

*Primary Examiner* — Árpád Fábián-Kovács
(74) *Attorney, Agent, or Firm* — Birch, Stewart, Kolasch & Birch, LLP

(57) ABSTRACT

A conveying arrangement conveys loose material in a conveying direction, in particular agricultural material. Several knives of a cutting assembly are mounted below a cutting area guiding surface. The material is first conveyed along the cutting area guiding surface and afterwards along a further guiding surface. Both guiding surfaces are mechanically supported by a connecting assembly. A positioning mechanism can pivot the connecting assembly upwards and downwards. This pivotal movement causes both guiding surfaces to be moved upwards and downwards. The cutting area guiding surface together with the cutting assembly can be shifted laterally, i.e. perpendicular to the conveying direction, and is guided during this lateral movement.

17 Claims, 6 Drawing Sheets

(51) Int. Cl.
*B02C 13/286* (2006.01)
*A01F 15/10* (2006.01)
*A01D 90/04* (2006.01)
*A01D 41/12* (2006.01)
*A01D 61/00* (2006.01)
*A01F 17/02* (2006.01)
*A01F 29/00* (2006.01)
*A01F 29/10* (2006.01)

(52) U.S. Cl.
CPC .............. *A01F 15/10* (2013.01); *A01F 17/02* (2013.01); *A01F 29/00* (2013.01); *A01F 29/10* (2013.01); *A01F 2015/107* (2013.01); *B02C 2013/28618* (2013.01)

(58) Field of Classification Search
CPC ....... A01F 29/04; A01F 29/095; A01D 90/04; B65G 19/04
See application file for complete search history.

(56) References Cited

U.S. PATENT DOCUMENTS

| | | | |
|---|---|---|---|
| 6,874,311 B2* | 4/2005 | Lucand | A01F 15/106 56/341 |
| 7,404,284 B2 | 7/2008 | Viaud et al. | |
| 9,226,452 B2* | 1/2016 | Biziorek | A01F 15/106 |
| 2002/0011061 A1* | 1/2002 | Lucand | A01D 90/04 56/341 |
| 2005/0198936 A1* | 9/2005 | Viaud | A01D 90/04 56/341 |
| 2008/0028737 A1* | 2/2008 | Viaud | A01F 17/00 56/341 |
| 2008/0028738 A1* | 2/2008 | Viaud | A01F 15/106 56/341 |
| 2013/0167498 A1* | 7/2013 | Haycocks | A01F 15/08 56/341 |
| 2013/0316770 A1* | 11/2013 | Haycocks | A01F 15/10 460/22 |
| 2016/0219789 A1* | 8/2016 | Derscheid | A01F 15/10 |
| 2016/0219790 A1* | 8/2016 | McClure | A01F 15/106 |
| 2016/0219792 A1* | 8/2016 | Singh | A01F 29/04 |
| 2016/0302363 A1* | 10/2016 | Ravaglia | A01F 15/10 |

FOREIGN PATENT DOCUMENTS

| | | | |
|---|---|---|---|
| DE | 19841598 A1 * | 3/2000 | ............ A01D 90/04 |
| DE | 199 28 521 A1 | 1/2001 | |
| DE | 10 2006 036 199 A1 | 2/2008 | |
| EP | 0 815 720 A1 | 1/1998 | |

* cited by examiner

CONVEYING ARRANGEMENT WITH KNIVES WHICH CAN BE PIVOTED VERTICALLY AND SHIFTED LATERALLY

INTRODUCTION

The invention refers to an arrangement for conveying and cutting loose material in a conveying direction, in particular for conveying loose agricultural material to a baling chamber.

STATE OF THE ART

In DE 102006036199 A1 and U.S. Pat. No. 7,404,284 B2 a conveying and cutting assembly is described. Agricultural material is conveyed above a guiding surface 26 forming the bottom of a feeding channel. The feeding channel guides loose material to a pressing chamber. The guiding surface 26 is pivotally mounted at a frame of a baler. When being in a working position, several knives of a cutting arrangement 28 penetrate through corresponding longitudinal slots in the guiding surface from below into the feeding channel. A positioning arrangement 30, e.g. a hydraulic cylinder, is connected with the guiding surface 26 as well as with the frame and can lift up and lower down the guiding surface together with the knives penetrating the slots. For maintenance purpose the cutting arrangement 28 can be shifted laterally with respect to the frame and in the plane of the guiding surface 26. In one embodiment several guiding elements, e.g. rails, guide the guiding surface 26 laterally. In one embodiment the cutting arrangement 28 with the knives is divided into two modules. The one module can be shifted laterally to the left and the other module laterally to the right at a frame.

FIG. 1 of DE 19928521 A1 shows a baler ("Aufsammelpresse") with a feed channel ("Zuführkanal 1") and a conveying unit ("Fördereinrichtung 2") for conveying material into a press channel ("Presskanal 7"). A cutting unit ("Schneidvorrichtung 5") has a conveying rotor ("Förderrotor 6") with tines ("Förderzinken 10") and engaging cutting knives ("Schneidmesser 8"). These knives 8 penetrate ("durchgreifen") several longitudinal slots ("Langlochschlitze") in the bottom of the cutting unit 5 ("Schneidwerkboden 7"). The feed channel 1 is oriented downwards from the cutting unit bottom 7 and has a bottom with two parts: an upper bottom part ("oberer Bodenteil 15") being stationary mounted at the pressing channel 3 and a lower bottom part ("unterer Bodenteil 17") being rotatable around the axis 16. The lower bottom part 17 is connected with the cutting unit bottom 7 by means of an articulation. This connecting articulation has the two perpendicular rotational axes 13, 21. In addition the lower bottom part 17 can be rotated around the axis 16 with respect to the upper bottom part 15. A spring 26 pulls at the pin 13 and thereby pulls the cutting unit 5 into its normal operating position. A hydraulic cylinder ("Hydrozylinder 12") is connected at its upper end at the pressing channel 3, cf. FIG. 1 and FIG. 2. A bolt ("Anlenkbolzen 25") connects the cylinder 12 pivotally ("angelenkt") with the pressing channel 3. At its lower end the cylinder 12 is connected with the cutting unit bottom 7, cf. FIG. 2 and FIG. 3. The lower end is pivotally connected with the pin 13 which is mounted at the cutting unit bottom 7.

The device described in DE 9308656 U1 conveys the material in a conveying channel ("Förderkanal 4") by means of a conveying device ("Fördervorrichtung 5"). In addition the device has a set of knives ("Messer 3") of a cutting arrangement ("Schneidwerk"). The knives 3 are mounted on a knives frame ("Messerrahmen 1"). This knives frame 1 is mounted in a cutting arrangement carrier ("Schneidwerkträger 2"). This cutting arrangement carrier 2 can be pivoted around a pivoting axis ("Schwenkachse 19") which is horizontal and perpendicular to the longitudinal direction ("Längsachse 13") of the loader wagon. The cutting arrangement carrier 2 is mounted by means of pins ("Achszapfen 26, 26") which are supported by corresponding bearings ("Schwenklager 27, 27"), cf. FIG. 1 and FIG. 2. By pivoting the cutting arrangement carrier 2 with the knives frame 1 with respect to the feeding channel 4 the knives 3 are pivoted into the and out of the feeding channel 4. The knives frame 1 for the knives 3 has a travel carriage ("Fahrwerk 12") with four idler rollers ("Laufrollen 16"). Therefore the frame 1 can be shifted in guide elements ("Führungen 17") of an intermediate frame ("Zwischenrahmen 14"). The intermediate frame 14 can be shifted with respect to the carrier 2 by means of a further travel carriage and further guide elements 17. This arrangement makes it possible to lower the frame 1. By lowering the frame 1 this frame 1 is removed from its working position. After having lowered the frame 1, the frame 1 can be shifted in a direction perpendicular to the length axis 13 of the baler, cf. FIG. 2. The knives 3 become accessible.

OBJECT

It is an object of the invention to provide a conveying assembly for loose material with a cutting assembly for cutting this material where the cutting assembly can be pivoted downwards and upwards for resolving jams as well as be shifted laterally into a maintenance position wherein the pivoting and the shifting can be performed easier and quicker.

SOLUTION

The problem is solved by a conveying arrangement with the features of claim 1 and by a conveying arrangement with the features of claim 17. Preferred embodiments are specified in the dependent claims.

The conveying arrangement according to the invention is connected with a frame of a material processing arrangement or can be connected with such a frame.

The conveying arrangement conveys loose material in a conveying direction. The conveying arrangement according to the invention as specified in claim 1 conveys the loose material such that the material is guided above and along a cutting area guiding surface and along and above a further guiding surface. The cutting area guiding surface as well as the further guiding surface are pivotally connected or are arranged for being pivotally connected with the frame. A connecting assembly is arranged between the two guiding surfaces and mechanically supports the two guiding surfaces. This mechanical support enables both guiding surfaces to be pivoted with respect to the frame upwards and downwards.

A positioning means holds the connecting assembly and can move the connecting assembly and therefore both guiding surfaces in an upward direction and in a downward direction. Both directions are perpendicular or angular to the conveying direction.

The cutting area guiding surface is connected with a cutting assembly for cutting the conveyed loose material. The cutting assembly can be shifted laterally with respect to the conveying direction, i.e. perpendicular or angular to the conveying direction and perpendicular or angular to the connecting assembly.

The invention as specified in claim 17 further refers to a conveying arrangement with a cutting area guiding surface and a cutting assembly mounted at the cutting area guiding surface. The cutting area guiding surface carries the cutting assembly. The entire cutting area guiding surface together with the cutting assembly can be shifted in the lateral direction, i.e. perpendicular or angular with respect to the conveying direction.

The invention refers to such a core conveying arrangement and further refers to a feeding arrangement with such a conveying arrangement and a frame. The conveying arrangement is connected with this frame.

ADVANTAGES

According to the invention the cutting assembly can be shifted laterally with respect to the conveying direction. This feature enables to shift the cutting assembly into a position in which maintenance work at the cutting assembly or at the cutting area guiding surface is possible. In particular it is possible to obtain access to the knives and to grind a knife or replace a knife with a further knife or to remove loose material out of the cutting assembly.

According to the invention the guiding surface of the conveying arrangement is divided into a cutting area guiding surface and a further guiding surface. Both guiding surfaces are carried by the frame and can be pivoted with respect to the frame. Thanks to the connecting assembly the cutting area guiding surface can additionally pivot with respect to the further guiding surface in two directions. This feature yields are higher degree of freedom in pivoting the guiding surface compared with a one-part guiding surface. The same space available for conveying loose material enables to provide a conveying arrangement with a higher throughput of loose material.

The connecting assembly implements a mechanical connection between the cutting area guiding surface and the further guiding surface. Thanks to this mechanical connection the cutting area guiding surface with the cutting arrangement can be pivoted clockwise and anti-clockwise with respect to the further guiding surface. Thanks to the connecting assembly the two guiding surfaces are not directly connected with each other. Therefore a greater range of pivoting becomes possible. In particular the two surfaces can be moved along a greater distance up and down. In addition the further guiding surface does not have to carry the cutting area guiding surface, in particular not during the step of shifting the cutting assembly laterally. The weight of the cutting assembly and the pressure stemming from loose material above one guiding surface is carried by the connecting assembly and does not impose an impact onto the other guiding surface. Therefore less iron or other material is required for the further guiding surface, and weight is saved. Nevertheless a sufficient stability is achieved.

The positioning means holds the connecting assembly in a controllable position with respect to the frame. By this feature the two guiding surfaces are also held in a controllable position with respect to the frame. Pivoting the guiding surfaces up and down via the connecting assembly changes the cross-sectional area above the guiding surfaces in a controllable way. This cross-sectional area is available for conveying loose material in the conveying direction. In particular it is possible to lower down both guiding surfaces for preventing or removing a jam above the guiding surfaces.

The positioning means is connected with the connecting assembly and is connected or can be connected with the frame. The positioning means lifts up and moves down the connecting assembly. The connecting assembly itself holds and moves the two guiding surfaces and causes that both guiding surfaces are pivoted with respect to the frame.

Therefore the positioning means does not directly holds one guiding surface and does not directly move one guiding surface up and down. It is not necessary that one guiding surface moves up and down the other guiding surface. Thanks to the invention it is also not necessary to connect the positioning means directly with one guiding surface. Therefore the guiding surfaces can be constructed with less material and a smaller weight as the forces urged by the positioning means hit the connecting assembly and not directly one guiding surface. The connecting assembly can be constructed as rigid and as strong as necessary. It is easier to implement a pivotal connection between the positioning means and a guiding surface. The connecting assembly can be arranged in a position in which it does not form an obstacle for conveying loose material along and above the two guiding surfaces.

EMBODIMENTS

In one embodiment the conveying arrangement conveys the loose material first along and above the cutting area guiding surface with the cutting assembly and afterwards along and above the further guiding surface. Seen in the conveying direction the further guiding surface is arranged downstream from the cutting area guiding surface. This embodiment has be effect that the loose material is already cut when being conveyed along the further guiding surface.

It is also possible to convey the material first along and above the further guiding surface and afterwards along and above the cutting area guiding surface with the cutting assembly. In both embodiments a further processing member, e.g. a pre-pressing unit or a downholder or a conveying rotor, can be arranged above the further guiding surface.

Different embodiments are possible how the connecting assembly supports the two guiding surfaces. In one embodiment one guiding surface is pivotally connected with the connecting assembly. The other guiding surface is supported from below by the connecting assembly. The force of gravity urges the other guiding surface into a releasable mechanical contact with the connecting assembly. This embodiment yields to an even higher degree of freedom in operating the conveying arrangement and in performing service operations. It is possible to shift the other guiding surface laterally with respect to the connecting assembly, i.e. perpendicular or angular to the conveying direction. For shifting the other guiding surface no mechanical connection needs to be released.

Preferably both guiding surfaces are connected or can be connected with the frame in a manner such that every guiding surface can be pivoted with respect to the frame around a pivoting axis. By this embodiment two different pivoting axes which are perpendicular to the conveying direction are provided. This embodiment enables to achieve a load distribution which is symmetrical to the conveying direction.

According to the invention a positioning means can move the connecting assembly up and down and can by this movement pivot both gliding surfaces. In one embodiment an additional passive retaining member is connected with this connecting assembly and is connected or connectable with the frame. A high amount of loose material above the guiding surfaces urges the two guiding surfaces downwards against the retaining force of the retaining member. The retaining member lifts up the connecting assembly and thereby both guiding surfaces against the force of gravity. Thanks to the connecting assembly it is not necessary to connect the retaining member directly with one guiding surface.

Preferably not only the cutting assembly but also the cutting area guiding surface can be shifted laterally with respect to the connecting assembly and with respect to the frame. Therefore the cutting area guiding surface together with the cutting assembly can be shifted in the lateral direction with respect to the conveying direction. This embodiment enables a simple and stable guiding mechanism which can be spaced apart from the cutting assembly and is therefore less polluted by cut loose material.

In one embodiment the cutting assembly cannot be shifted laterally with respect to the cutting area guiding surface but only together with the cutting area guiding surface. No guiding means for guiding the cutting assembly with respect to the cutting area guiding surface is required. This feature enables to shift the cutting assembly laterally and saves the need to pivot in advance the cutting assembly with respect to the cutting area guiding surface into a position where the knives are entirely retracted and do not engage the cutting area guiding surface. Such a step would be necessary if the cutting assembly were to be shifted laterally with respect to the cutting area guiding surface. Saving this pivoting step saves time. The cutting assembly can quicker be shifted laterally into a maintenance position. It is in particular not necessary first to lower down the cutting assembly with respect to the cutting area guiding surface and afterwards to shift the cutting assembly laterally.

The embodiment that the entire cutting area guiding surface with the cutting assembly can be shifted laterally has a further advantage: It is not necessary to mount a guiding means for the cutting assembly, e.g. a rail or a wheel, at the lower surface of the cutting area guiding surface. Such a guiding means can be arranged close to the ground and can easily be polluted. Thanks to the invention the guiding means is for guiding the entire cutting area guiding surface and can be arranged with a greater distance to the ground.

According to the invention the loose material is guided along and above the cutting area guiding surface and along and above the further guiding surface. A further advantage of two guiding surfaces in place of one integrally formed guiding arrangement is: Only the cutting area guiding surface has to be shifted laterally in order to obtain access to the cutting assembly. It is not necessary to shift the entire guiding arrangement laterally. Therefore less space beside the conveying arrangement is required.

In one implementation the cutting area guiding surface with the cutting assembly is supported from below by the connecting assembly but is not rigidly connected with the connecting assembly. This makes it very easy to shift laterally the cutting area guiding surface together with the cutting assembly with respect to the connecting assembly and thereby with respect to the frame.

In one embodiment a rail system is mounted or can be mounted at the frame and guides the cutting area guiding surface laterally. At least one wheel is connected with the cutting area guiding surface and rolls along this rail system. Preferably at least two wheels roll along this rail system and are connected with a traversal holder which in turn is connected with the cutting area guiding surface. The cutting area guiding surface can be pivoted with respect to the rail system and thereby with respect to the frame carrying the rail system. In one implementation the cutting area guiding surface can be pivoted with respect to the wheels. In a further implementation the wheels can be pivoted with respect to the rail system. It is also possible that the rail system is mounted at the cutting area guiding surface and the or every wheel is or can be rotatably mounted at the frame.

In an alternative embodiment a rigid traversal beam guides the cutting area guiding surface in the lateral direction. Preferably the traversal beam is rigidly mounted at the frame. In addition the cutting area guiding surface can be pivoted around a pivoting axis which is equal with or parallel to the longitudinal axis of the traversal bearing. This embodiment leads to a compact construction.

Preferably the connecting assembly comprises a left part and a right part—seen in the conveying direction. The guiding surfaces are arranged between the left part and the right part—at least if the cutting assembly is in an operating mode. This embodiment guarantees that no part of the connecting assembly becomes an obstacle for the step of conveying the loose material in the conveying direction and above and along the guiding surfaces.

In one embodiment the connecting assembly comprises two longitudinal bearing units which extend parallel to the conveying direction. A traversal bearing and guiding unit mechanically connects these two longitudinal bearing units and supports the cutting area guiding surface from below. This embodiment does not inhibit the process of conveying the loose material along and above the surfaces. In addition the bearing and guiding unit supports the cutting assembly also during the shifting in the lateral direction and when being shifted laterally. In addition this embodiment does not require a spring or telescope as a part of the connecting assembly. It is an advantage not to use a spring or telescope as these parts can wear more rapidly. It is easier to implement a mechanism in which the entire cutting area guiding surface including the cutting assembly can be shifted laterally and is supported from below by the connecting assembly with the traversal bearing and guiding unit even while and after being shifted laterally.

In one embodiment the cutting assembly or the entire cutting area guiding surface with the cutting assembly is shifted laterally by a human operator. In a further embodiment a cutting assembly shifting member automatically shifts the cutting assembly or the entire cutting area guiding surface laterally with respect to the frame, i.e. in the lateral direction. This cutting assembly shifting member is connected with the frame and with the cutting area guiding surface or with the cutting assembly and can preferably shift the cutting assembly or the entire cutting area guiding surface together with the cutting assembly laterally out of the frame and back into the frame. The embodiment in which both guiding surfaces are directly connected with each other yields an even more economic conveying arrangement, in particular if the cutting assembly is arranged near the ground;

The embodiment that the entire cutting area guiding surface together with the cutting assembly can be shifted laterally can be integrated into a conveying arrangement with a connecting assembly supporting the cutting area guiding surface and the further guiding surface. This embodiment can also be integrated into a conveying arrangement in which the cutting area guiding surface is mechanically connected with the further guiding surface in a manner that the cutting area guiding surface can be shifted laterally with respect to the further guiding surface. The advantages of a cutting area guiding surface which can be shifted laterally have just been sketched. This embodiment with the cutting area guiding surface connected with the further guiding surface does not necessarily require a connecting assembly. Preferably a guiding system, i.e. a system with a rail and with wheels, guides the cutting area guiding surface with respect to the further guiding surface.

In one implementation a vertical positioning means is connected with the cutting area guiding surface or with the further guiding surface and can lower down and lift up this connected guiding surface. The other guiding surface is pivotally connected with this connected guiding surface and is also lowered down or lifted up.

In one embodiment the cutting assembly—or the entire cutting area guiding surface—can be shifted with respect to the frame into two lateral directions, namely to the left and to right with respect to the conveying direction. This embodiment makes it possible to get access to every knife by shifting the cutting assembly over no more than half the width of the cutting assembly.

The invention can be used on board of a vehicle which is moved over ground and picks-up loose material from the ground, e.g. loose crop material or waste material. The conveying arrangement is a part of this vehicle and processes the picked-up material. The invention can also be used in a stationary plant, e.g. a plant for processing waste or recycling material (paper, cartridges, plastic elements, e.g.).

These and other aspects of the invention and of the preferred embodiment will be even more apparent from the detailed embodiment as described below and will be elucidated in detail there.

DESCRIPTION OF EMBODIMENT

In the following an embodiment of the invention is described with reference to the following figures.

Figure 1:
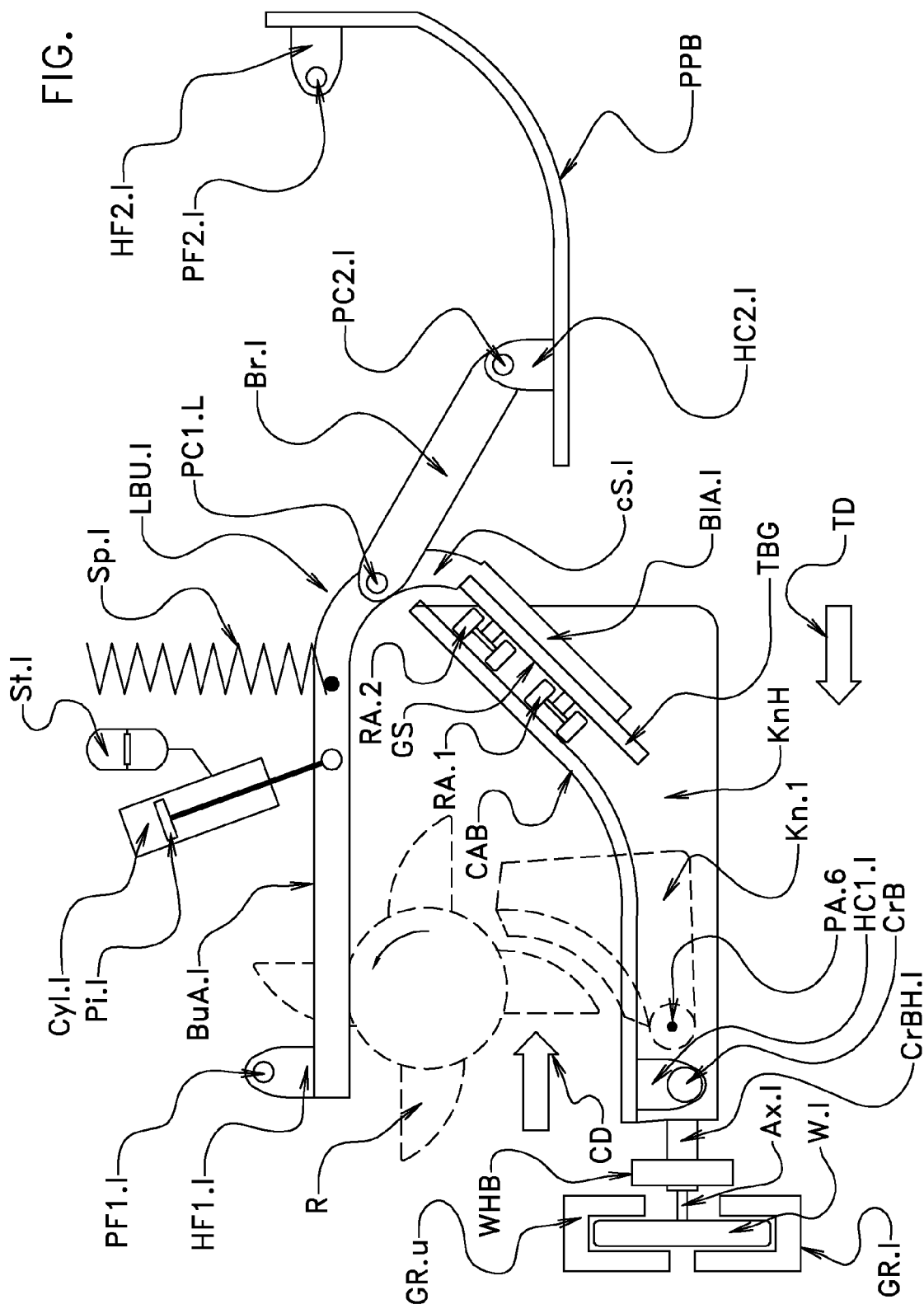
FIG. 1 shows schematically one embodiment of the conveying arrangement with the connecting assembly in a side view.

In the embodiment the invention is used in a baler for agricultural purposes. This baler has no own drive but is pulled over ground by a tractor or combine harvester or field chopper, e.g., in a travelling direction TD. The baler presses loose crop material, e.g. hay, straw, silage, into a continuous string with a rectangular cross-section which the baler afterwards divides into cuboid bales. Or the baler creates round bales. The baler wraps the bales such that the bales cannot fall apart and deposits the wrapped created bales onto the ground.

In both embodiments a pick-up unit picks up loose agricultural material from the ground. This picked-up crop material is pressed through a feeding channel towards the inlet of a pressing chamber, e.g. a pressing channel. The operating width of the pick-up unit (its dimension perpendicular to the travelling direction TD) is preferably larger than the width of the inlet. Therefore two lateral conveying units, e. e. two augers, rotate around a joint axis perpendicular to the travelling direction TD and convey picked-up material laterally and inwardly. A cutting assembly with several knives cuts the loose crop material before the material reaches the pressing chamber. The loose material is afterwards pressed towards and through this inlet and to the pressing chamber.

A pressing means in the pressing chamber presses together the crop material such that a bale is created in the pressing chamber. The circumferential shape of the pressing chamber wall molds the shape of the bale in this pressing chamber. The pressing means can comprise an oscillating piston, a rotating auger, several endless pressing belts or several rotating pressing rollers. After having finished the creation of the bale, the bale is wrapped into a net or several strands of twine or a sheet which is injected into the pressing chamber such that the bale in the pressing chamber is wrapped. The wrapped bale is ejected out of the pressing chamber. In one embodiment the ejected wrapped bale is further wrapped into a sheet which is impermeable.

In one embodiment the pressing chamber is arranged as a pressing channel. In the feeding channel the crop material is cut and a step of pre-pressing the crop material is performed. The pre-pressed crop material is inserted through the inlet into the pressing channel. The pressing means presses the pre-pressed material from the inlet through the pressing channel in a pressing direction towards the outlet. This pressing direction is opposite (anti-parallel) to the traveling direction TD into which the baler is moved over ground. A continuous string of material is created. A cuboid bale is separated from this string, e.g. by guiding at least one knotter needle with a strand of twine through the string and tying this strand with a further strand of twine. The pressing means comprises a piston or an auger or several rotors. The piston reciprocates parallel to the travelling direction TD.

In a further embodiment the pressing chamber has a form similar to a drum with two sidewalls extending parallel to the travelling direction TD and a circumferential surface extending between these two sidewalls. In this embodiment the baler creates a round-cylindrical bale. The symmetrical axis of this drum is perpendicular to the sidewalls and to the travelling direction TD. Several conveying units convey material around this rotational axis and along the circumferential wall and press the material. At least some conveying units comprise rollers with rotational axes parallel to the rotational axis of the drum and perpendicular to the travelling direction TD. In one embodiment at least one conveying unit comprises an endless belt which is guided around driven and around idler rollers. The rotational axes of these guiding rollers are also parallel to the drum's rotational axis.

In one embodiment at least one guiding roller can be shifted laterally, i.e. perpendicular to the rotational axes, by a positioning means, e.g. by a hydraulic cylinder, for implementing a pressing chamber with variable size which urges an approximately constant pressure onto an increasing bale in the chamber. In an alternative embodiment the guiding rollers are mounted such that they can only rotate and not being shifted laterally such that a pressing chamber with fixed size is implemented.

The embodiment of the invention refers to the feeding channel between the pick-up unit and the pressing chamber. This feeding channel belongs to the conveying arrangement of the embodiment. The feeding channel comprises a cutting area comprising the cutting assembly and a pre-pressing area arranged behind the cutting area, i.e. between the cutting assembly and the pressing chamber. The cutting area comprises a cutting area bottom and in one implementation two sidewalls. In the embodiment the pre-pressing area comprises a pre-pressing area bottom and in one implementation further sidewalls. The crop material is first conveyed and pressed through the cutting area and afterwards through the pre-pressing area. The crop material is guided above and along these two bottoms. Both bottoms have an upper guiding surface with low friction.

Figure 2:
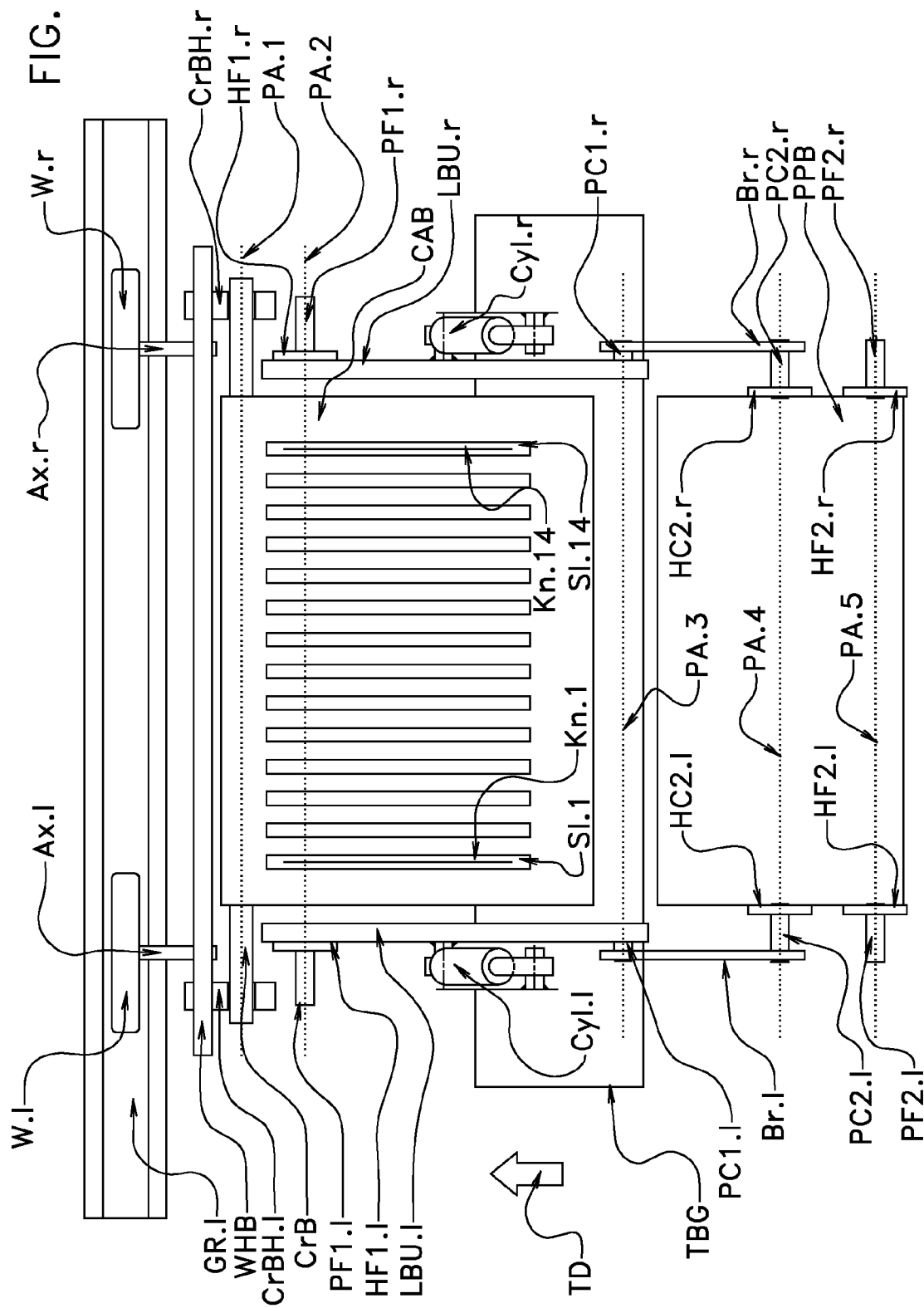
FIG. 2 shows schematically the embodiment of FIG. 1 in a top view.

FIG. 1 schematically shows an embodiment of this feeding channel with the cutting area bottom CAB and the pre-pressing area bottom PPB in a side view. Both bottoms CAB, PPB slope upwards. FIG. 2 shows the embodiment of FIG. 1 in a top view. The sidewalls of the feeding channel, the pick-up unit, and the frame of the baler are not shown in the figures. The cutting area bottom CAB serves as the cutting area guiding surface. The pre-pressing area bottom PPB serves as the further guiding surface.

An undershot rotor R with several rigid tines rotates around a rotating axis perpendicular to the drawing plane of FIG. 1 and conveys material above the cutting area bottom CAB in a conveying direction CD which is antiparallel to the travelling direction TD of the baler. This driven rotor R belongs to the conveying assembly of the embodiment. In FIG. 1 the rotor R rotates anti-clockwise. In one implementation a further undershot rotor (not shown) with several rigid tines conveys the cut material above the pre-pressing area bottom PPB in the conveying direction CD. In a further implementation a stuffing means with several stuffing tines (also not shown) further conveys the crop material along the pre-pressing area bottom PPB and pre-presses the crop material in the pre-pressing area. It is also possible that a top wall or a down holder is arranged above the pre-pressing bottom and limits the rear part of the feeding channel from above.

The crop material is cut in the cutting area. For this purpose a cutting assembly is mounted below the cutting area bottom CAB and engages from below into the feeding channel. The cutting area bottom CAB carries the cutting assembly and therefore the cutting assembly is not directly connected with the baler's frame. The cutting assembly comprises several knives arranged in a sequence perpendicular to the conveying direction CD. In one implementation the knives are pivotally mounted on at least one axle extending perpendicular to the conveying direction CD. In one implementation the cutting area bottom CAB carries this knives-holding axle. In a further implementation a knives holder with a rectangular frame carries the knives-holding axle. The knives holder frame is connected with the cutting area bottom CAB.

Every knife can be pivoted to an operating position. In this operating position the knife penetrates a corresponding longitudinal slot in the cutting area bottom CAB and engages from below into the feeding channel. In one implementation every knife is pivotally connected by means of a lever with a shaft arranged below the cutting area bottom CAB. If this shaft is rotated, the knife is rotated around the knives-holding axle via the lever.

In FIG. 1 and FIG. 2 several knives Kn.1, . . . , Kn.14 and a knives holder KnH are shown. The knives Kn.1, . . . , Kn.14 are shown in an operating position in which they penetrate the corresponding longitudinal slots Sl.1, . . . , Sl.14. These slots Sl.1, . . . , Sl.14 are arranged in the cutting area bottom CAB and extend in the conveying direction CD.

In one embodiment every knife is secured with a mechanical spring. In a further embodiment a hydraulic spring secures the knives or the knives holder. A rigid object in the crop material picked-up from the ground pivots the knife away against the force of the spring. The spring urges the knife into the operating position.

In one embodiment the cutting assembly comprises several knives sets. The operator can determine that the baler operates with one knives set in the operating position and a further knives set in a non-operating position or with all knives sets in the operating position. Every knife Kn.1, . . . , Kn.14 belongs to exactly one knives set. Between two knives of the one knives set a knife of the other knives set is arranged.

In one implementation a sensor checks whether all knives—or all knives of a knives set—are in the operating position or in a non-operating position. This sensor can contactless detect the position of a knife or can measure the rotational position of a shaft rotating the knives, e.g.

During operation a subset or all of the knives Kn.1, . . . , Kn.14 penetrate from below through the slots Sl.1, . . . , Sl.14 in the cutting area bottom CAB into the cutting area. The rotor R with its several rigid tines is arranged above the cutting area bottom CAB. In FIG. 1 the rotor R rotates anti-clockwise. The rotor R is driven and rotates around a horizontal axis perpendicular to the travelling direction TD. The rotor R operates in an undershot operating mode. A rigid tine of the rotor R penetrates into the space between two adjacent knives provided these knives are in the operating position. Crop material is pressed through the spaces between the knives and is cut by the knives Kn.1, . . . , Kn.14.

Every knife Kn.1, . . . , Kn.14 can be pivoted into a non-operating position in which the knife is entirely below the cutting area bottom CAB and does not penetrate a slot Sl.1, . . . , Sl.14 in the cutting area bottom CAB. In one embodiment the cutting assembly comprises one knives set positioning means (not shown), e.g. a horizontal hydraulic cylinder or an electrical motor, for every knives set. This knives set positioning means pivots all knives of the corresponding knives set. In one implementation the knives of a knives set can be rotated around a horizontal axis perpendicular to the travelling direction TD. Every knife is connected with a lever. The knives set positioning means rotates a shaft which is connected with the levers for the knives of one knives set via one connecting element which is rigidly mounted on the shaft and hingedly connected with the lever. This knives set positioning means is connected with the shaft and with the frame of the knives holder KnH or with the frame. A cutting assembly with two knives sets and one lever per knife is described in EP 1584226 B1. It is not necessary to rotate the knives holder KnH for pivoting the knives of a knives set into an operating position or into a non-operating position.

In FIG. 1 and FIG. 2 the knives Kn.1, . . . , Kn.14 can be rotated around the horizontal rotating axis PA.6. This rotating axis PA.6 is perpendicular to the drawing plane of FIG. 1 and lies in the drawing plane of FIG. 2.

In one embodiment the knives set positioning means for a knives set also secures the knives of this knives set. A rigid object in the loose material which was picked-up from the ground urges against a knife and pivots this knife and therefore the shaft and all other knives of this knives set against the force of the positioning means. The positioning means urges the knives of the knives set into the operating position. This embodiment saves an own securing spring for every knife.

In one embodiment it is possible to operate the conveying arrangement without cutting feature, i.e. all knives are in a non-operating position.

The pre-pressing area of the embodiment comprises the further rotor or the stuffing means (not shown) or an alternative pre-pressing unit or a top wall or a downholder mounted above the pre-pressing area bottom PPB. This pre-pressing unit comprises a rod or another longitudinal traversal bearing. Several conveying or stuffing tines are mounted on this traversal bearing. The longitudinal axis of this rod is horizontal and is arranged perpendicular to the travelling direction TD. The tines extend radially from this longitudinal axis. A drive rotates the bearing around its own longitudinal axis or along a closed trajectory such that the rotating tines press the material towards the inlet of the pressing chamber.

The pre-pressing unit operates in two modes, a collecting (stuffing) mode and a loading mode. In a pre-pressing mode the pre-pressing unit presses together material in the feeding channel without conveying it further. The inlet to the pressing chamber is closed, e.g. by a retaining rake or a further closing member. In a feeding mode the feeding channel is opened by pivoting the closing member. The pre-pressing unit conveys the pre-pressed material into the pressing chamber and towards a position ahead of the piston. Afterwards the piston oscillating with the constant frequency presses the pre-pressed crop material into the pressing channel and through the pressing channel towards the outlet.

The baler comprises a frame (not shown) which is coupled via a drawbar comprising a hook with the pulling vehicle. The frame carries the pressing chamber and is mounted on several wheels. The cutting area bottom CAB as well as the pre-pressing area bottom PPB are pivotally connected with this frame and are arranged below the frame. The cutting area bottom CAB as well as the pre-pressing area bottom PPB can be rotated with respect to the frame around two different horizontal pivoting axes both being perpendicular to the travelling direction TD. The pivoting axis of the cutting area bottom CAB is arranged at the or near the front edge of the cutting area bottom CAB. The pivoting axis of the pre-pressing area bottom PPB is arranged at the or near the rear edge of the pre-pressing bottom PPB.

In one implementation every bottom CAB, PPB is arranged such that its pivoting axis is stationary. In a further implementation one pivoting axis can be shifted laterally up and down, e.g. by a positioning means. In this further implementation this bottom can be pivoted and can additionally be lowered downwards and shifted upwards.

The step of pivoting downwards and optionally of lowering downwards move the both bottoms CAB, PPB away from the rotor R and from the pre-pressing unit. By this movement the cross-sectional face of the feeding channel is enlarged.

This enlargement of the cross-sectional face increases the throughput capacity of the feeding channel and helps to automatically prevent or remove a jam which may be caused by a huge amount of crop material in the feeding channel. This enlargement saves the need that an operator switches off the baler and performs a manual jam clearing operation. It is also not necessary to reverse the conveying direction of the rotor R.

In the top view of FIG. 2 the pivoting axis PA.1 for the cutting area bottom CAB and the pivoting axis PA.5 for the pre-pressing area bottom PPB are shown. The pivoting axis PA.1 passes through the cross bearing unit CrB (described below) and is arranged near the front edge of the cutting area bottom CAB—seen in the conveying direction CD. The pivoting axis PA.5 runs through the objects PF2.*l* and PF2.*r* (also described below) and is arranged near the rear edge of the pre-pressing area bottom PPB.

In the embodiment a cross bearing unit CrB is mounted below the cutting area bottom CAB and near the front edge of the cutting area bottom CAB—seen in the travelling direction TD. The cross bearing unit CrB can be implemented as one through-going traversal beam or as two single beams mounted at the left side and the right side below the cutting area bottom CAB, resp. The cross bearing unit CrB extends perpendicular to the conveying direction CD and is held by two cross bearing holders CrBH.l, CrBH.r which may be implemented as two pins, cf. FIG. 2. These two pins CrBH.l, CrBH.r are guided through apertures in the cross bearing unit CrB and through apertures in a further traversal bearing WHB being parallel to the cross bearing unit CrB, cf. FIG. 1 and FIG. 2. The cross bearing unit CrB is guided through two apertures in the two holders HC1.*l* and HC1.*r* which are rigidly mounted at the left and right side, resp., below the cutting area bottom CAB, cf. FIG. 1. The cutting area bottom CAB rests on these two holders HC1.*l* and HC1.*r*. The cross bearing unit CrB carrying the cutting area bottom CAB can be rotated around the two cross bearing holders CrBH.l, CrBH.r. The holders HC1.*l*, HC1.*r* can rotate around the cross bearing unit CrB. Therefore the cutting area bottom CAB and the two holders HC1.*l*, HC1.*r* can be rotated around the pivoting axis PA.1, cf. FIG. 1.

Figure 3:
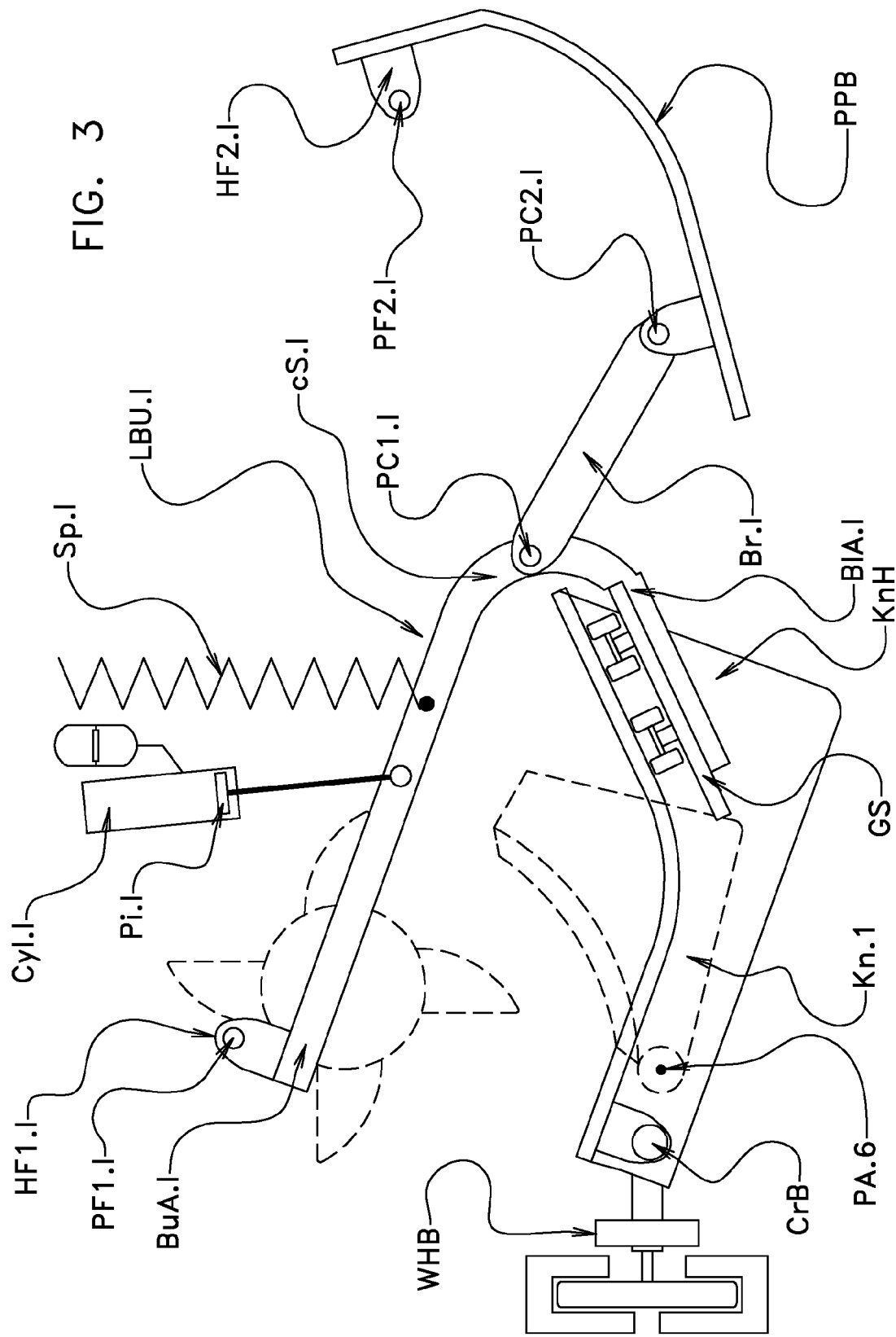
FIG. 3 shows schematically the embodiment of FIG. 1 wherein the two guiding surfaces are lowered down.

FIG. 3 shows the embodiment of FIG. 1 in a side view after having pivoted downwards both bottoms CAB, PPB. The cutting area bottom CAB carrying the cutting arrangement is pivoted downwards around the first pivoting axis PA.1 running through the cross bearing unit CrB. The pre-pressing area bottom PPB is pivoted around the fifth pivoting axis PA.5 running through the second frame-mounted pins PF2.*l* and PF2.*r*. Both pivoting axes PA.1, PA.5 are perpendicular to the drawing plane of FIG. 3. The two bottoms CAB, PPB approximately form a V after being pivoted downwards, cf. FIG. 3. The distance over which the two bottoms CAB, PPB are moved is shown exaggerated in FIG. 3.

Preferably the pre-pressing area bottom PPB or the cutting area bottom CAB or both bottoms CAB, PPB are connected with a retaining mechanism, e.g. a spring arrangement. The respective bottom CAB, PPB is rotated and/or shifted downwards by the crop material against the force of this spring arrangement. At least one spring is mounted at the frame and is directly or indirectly connected with the bottom CAB, PPB. In place of or additional to a helical spring, a pneumatic or hydraulic element may be used as a retaining mechanism. The retaining mechanism urges onto both bottoms CAB, PPB and is not directly connected with one bottom but is connected with the connecting assembly (described below). In case of a jam both bottoms CAB, PPB are moved downwards such that the enlargement helps to remove the jam. When the jam is removed, the spring arrangement rotates and/or lifts the bottom upwards such that the cross-sectional area is made smaller. In the embodiment the spring arrangement is connected with a connecting assembly which will be explained below. The bottoms CAB, PPB are mechanically connected with this connecting assembly such that lowering down or shifting up the connecting assembly causes both bottoms CAB, PPB also to be lowered down or be shifted up.

In the embodiment this optional passive retaining mechanism (spring or pneumatic arrangement) for retaining the bottoms CAB, PPB is combined with an active mechanism for enlarging the cross-sectional face. A bottoms positioning means, e.g. one or two vertical hydraulic cylinders or electrical motors, can hold and can lower down and lift up both bottoms CAB, PPB in a controlled manner. This bottoms positioning means is at its upper end connected with the frame. The lower end is connected with the connecting assembly which will be explained below. During normal operation the bottoms positioning means urges and holds the connecting assembly and thereby both bottoms CAB, PPB and the cutting assembly in an upper operating position in which the crop material is cut and is afterwards pre-pressed. For preventing or removing a jam the bottoms positioning means lowers down the connecting assembly and both bottoms CAB, PPB together with the cutting assembly such that the cross-sectional face is enlarged.

Thanks to the connecting assembly it is not necessary to connect the bottoms positioning means or the passive retaining mechanism directly with one bottom CAB, PPB. Therefore it is not necessary that one bottom holds or lifts up the other bottom. In contrast the connecting assembly pivots both bottoms CAB, PPB simultaneously.

FIG. 1 and FIG. 2 show two spring elements forming the passive retaining mechanism. A left tension spring Sp.l and a right tension spring Sp.r are vertically arranged and are at their upper ends connected with the frame. These springs Sp.l, Sp.r are connected at their lower ends with the connecting assembly. The bottoms CAB, PPB can be lowered downwards against the retaining force of these springs Sp.l, Sp.r. A left vertical cylinder Cyl.l and a right vertical cylinder Cyl.r are also connected with the frame and with the connecting assembly. The piston Pi.l of the left cylinder Cyl.l defines an upper chamber and a lower chamber within this cylinder Cyl.l. The lower chamber is connected with a storage St.l, e. g. an accumulator comprising a membrane and a chamber filled with a fluid which can be compressed, e.g. with nitrogen. The right vertical cylinder Cyl.r is arranged in the same way. These two vertical cylinders Cyl.l, Cyl.r belong to the active bottoms positioning means of the embodiment.

If the cutting area bottom CAB is lowered down by crop material, the connecting assembly is also lowered down against the force of the passive retaining mechanism, i.e. the springs Sp.l, Sp.r. The pistons Pi.l, Pi.r move downwards. The lower chambers of the cylinders Cyl.l, Cyl.r are emptied into a system of pipelines (not shown) and in addition into the corresponding storages St.l, St.r.

In FIG. 1 and FIG. 2 the two vertical cylinders Cyl.l, Cyl.r operate as the active bottoms positioning means. The cylinders are double-acting, i.e. their pistons Pi.l, Pi.r can actively be moved upwards and downwards by pressing fluid into the corresponding chamber.

In one embodiment the bottoms positioning means Cyl.l, Cyl.r is actuated manually by the operator (driver) by activating a button or another actuating element. In an alternative embodiment the bottoms positioning means is automatically activated. A sensor recognizes an overload situation, e.g. by measuring the torque at the driven main shaft of the baler or at the PTO shaft of the tractor or the counter-pressure effectuated by the crop material onto the knives Kn.1, . . . , Kn.14 of the cutting assembly or onto the pre-pressing unit. If the measured value exceeds a preset threshold, a control unit (not shown) automatically activates the bottoms positioning means Cyl.l, Cyl.r such that the cross-sectional phase of the feeding channel is enlarged.

In the situation shown in FIG. 3 the piston Pi.l of the left vertical cylinder Cyl.l has been lowered downwards. The piston Pi.r of the right vertical cylinder Cyl.r has also been lowered downwards. This movement causes the cutting area bottom CAB and the pre-pressing area bottom PPB to be lowered downwards in a controlled manner, compare FIG. 1 with FIG. 3.

In one embodiment a control unit (not shown) for the baler synchronizes the operations of the bottoms positioning means Cyl.l, Cyl.r with the operations of the knives set positioning means. If the bottoms positioning means Cyl.l, Cyl.r lowers down the two bottoms CAB, PPB, the knives set positioning means pivots all knives of the set into a no-operating position such that the knives Kn.1, . . . , Kn.14 do no longer penetrate the longitudinal slots Sl.1, . . . , Sl.14. The load onto the main drive shaft is rapidly reduced.

In a further embodiment the cutting area bottom CAB is lowered down while the knives Kn.1, . . . , Kn.14 do not change their relative position with respect to the cutting area bottom CAB and to the slots Sl.1, . . . , Sl.14. The cutting assembly can continue to cut crop material in the feeding channel.

According to the embodiment the cutting area bottom CAB with the longitudinal slots Sl.1, . . . , Sl.14 is not directly connected with the pre-pressing area bottom PPB. In contrast both bottoms CAB, PPB are mechanically supported by the already mentioned connecting assembly which is at least partially arranged between these two bottoms CAB, PPB. The force of gravity urges the cutting area bottom CAB onto the connecting assembly. The pre-pressing button PPB is supported by being pivotally connected with this connecting assembly. The bottoms positioning means Cyl.l, Cyl.r is also not directly connected with a bottom CAB, PPB but with this connecting assembly.

In the embodiment this connecting assembly comprises two longitudinal bearing units LBU.l, LBU.r extending parallel to the conveying direction CD and being arranged to the left and to the right, resp., of the two bottoms CAB, PPB. The cutting area bottom CAB—or at least a rear part of the cutting area bottom CAB—is situated between these longitudinal bearing units LBU.l, LBU.r. These two longitudinal bearing units LBU.l, LBU.r are pivotally connected with a front area of the pre-pressing area bottom PPB, e.g. by means of two brackets Br.l, Br.r and two holders HC2.l, HC2.r. Two connecting pins PC1.l, PC1.r are guided through two apertures in the two longitudinal units LBU.l, LBU.r and through two further apertures in the brackets Br.l, Br.r. In a further implementation (not shown) two pins directly connect the two longitudinal bearing units LBU.l, LBU.r with the pre-pressing bottom PPB.

The two longitudinal bearing units LBU.l, LBU.r are rigidly connected with each other by means of a traversal bearing and gliding unit TBG which is situated below the rear area of the cutting area bottom CAB and in one implementation also below the front area of the pre-pressing area bottom PPB. The cutting area bottom CAB is carried from below by the cross bearing unit CrB and by this traversal bearing and gliding unit TBG.

Seen in the travelling direction TD of the baler the left longitudinal bearing unit LBU.l and the right longitudinal bearing unit LBU.r are formed and are arranged parallel to each other. The distance between these two bearing units LBU.l, LBU.r is preferably at least as large as the width of the cutting area bottom CAB, i.e. its dimension perpendicular to the travelling direction TD. Therefore the longitudinal bearing units LBU.l, LBU.r do not form an obstacle for conveying crop material through the feeding channel in the conveying direction CD. The traversal bearing and gliding unit TBG connecting the longitudinal bearing units LBU.l, LBU.r is situated below the cutting area bottom CAB and does therefore also not form an obstacle.

To summarize the connecting assembly of the embodiment comprises
- a left longitudinal bearing unit LBU.l,
- a right longitudinal bearing unit LBU.r, and
- a traversal bearing and gliding unit TBG.

The traversal bearing and gliding unit TBG rigidly connects the two longitudinal bearing units LBU.l, LBU.r. The cutting area bottom CAB is situated between these two longitudinal bearing units LBU.l, LBU.r.

In one embodiment the bottoms positioning means Cyl.l, Cyl.r comprises a left vertical cylinder Cyl.l and a right vertical cylinder Cyl.r which are pivotally connected with the left and right longitudinal bearing units LBU.l, LBU.r of the connecting assembly, resp. As the connecting assembly supports the cutting area bottom CAB as well as the pre-pressing area bottom PPB, lowering down the connecting assembly causes both bottoms CAB, PPB rotating around two horizontal axes being perpendicular to the conveying direction CD. By this the cross-sectional face of the feeding channel is enlarged in a central part of the feeding channel whereas the inlet and the outlet of the feeding channel remain unchanged.

In one implementation the two longitudinal bearing units LBU.l, LBU.r each have two arms, namely an upper arm and a lower arm such that every longitudinal bearing unit LBU.l, LBU.r forms a J with a longer and a shorter beams. The two horizontal cylinders Cyl.l, Cyl.r are connected with the two longitudinal beams of the two Js. Preferably the two horizontal cylinders Cyl.l, Cyl.r are pivotally connected from outside with the two upper arms. The traversal bearing and gliding unit TBG is connected with the two short beams of the two Js (lower arms) or also with the two long beams (upper arms) such that the upper surface of the traversal bearing and gliding unit TBG forms a plane being perpendicular to the conveying direction CD. This implementation leads to a high mechanically stability.

In FIG. 1 the following parts of the left longitudinal bearing unit LBU.l are shown:
- the left upper arm BuA.l forming the long arm (upper beam) of the J,
- the left lower arm BlA.l forming the short arm (lower beam) of the J,
- a left connecting stub cS.l having the shape of an arc and connecting these two arms BuA.l, BlA.l,
- a first left frame-mounted holder HF1.l rigidly connected with the left upper arm BuA.l,
- a second frame-mounted left holder HC2.l which carries the pre-pressing button PPB,
- a first left pin PC1.l connecting the left bracket Br.l with the left stub cS.l, and
- a second left pin PC2.l connecting the left bracket Br.l with the holder HC2.l.

The left upper arm BuA.l, the left lower arm BlA.l, and the left connecting stub cS.l together form a J. The left tension spring Sp.l and the left vertical cylinder Cyl.l are pivotally connected with the left upper arm BuA.l.

The first left frame-connected holder HF1.l has an aperture through which a left frame-mounted pin PF1.l is guided. This pin PF1.l is rigidly connected with the frame. The first left frame-connected holder HF1.l and therefore the entire connecting assembly can rotate around this first left frame-mounted pin PF1.l and around a corresponding first right frame-mounted pin PF1.r. FIG. 2 shows the pivoting axis PA.2 which runs through the two first frame-mounted pins PF1.l and PF1.r. The two longitudinal bearing units LBU.l, LBU.r with the left arms BuA.l, BlA.l and the corresponding right arms are connected with the pins PF1.l, PF1.r and can be pivoted around this pivoting axis PA.2.

The two longitudinal bearing units LBU.l, LBU.r are rigidly connected with each other by means of the traversal bearing and gliding unit TBG which is situated below the cutting area bottom CAB and which is sloping upwards seen in the conveying direction CD. The traversal bearing and gliding unit TBG protrudes to the left and to the right seen in the travelling direction TD, cf. FIG. 2. In other words: The extension of the traversal bearing and gliding unit TBG exceeds the width of the cutting area bottom CAB and the distance between the two longitudinal bearing units LBU.l, LBU.r.

In one embodiment the pivotal connection between the connecting assembly and the pre-pressing area bottom PPB comprises the left bracket and the right bracket. Both brackets are pivotally connected with the connecting assembly and are also connected with the pre-pressing area bottom PPB. Both brackets can rotate around a first rotation axis with respect to the connecting assembly and around a second rotating axis with respect to the pre-pressing area bottom PPB. Both rotating axes are horizontal and are perpendicular to the travelling direction TD and to the conveying direction CD. Therefore the pre-pressing area bottom PPB can pivot with respect to the connecting assembly around two parallel rotating axes. This increases the flexibility of the conveying arrangement during operation.

FIG. 1 and FIG. 2 show a left bracket Br.l and a right bracket Br.r. The left bracket Br.l connects the left longitudinal bearing unit LBU.l with the left side of the pre-pressing area bottom PPB and has a first aperture for the first left connecting pin PC1.l and a second aperture for the second left connecting pin PC2.l. The first left pin connecting PC1.l is mounted at the left connecting stub cS.l. The second left connecting pin PC2.l is mounted at the second left holder HC2.l. This second left holder HC2.l is rigidly mounted at the left-hand side of the pre-pressing area bottom PPB. The right bracket Br.r is connected in a similar way with the right longitudinal bearing unit LBU.r and with the right-hand side of the pre-pressing area bottom PPB. Therefore the connecting assembly can be pivoted with respect to the pre-pressing area bottom PPB around two parallel pivoting axes, namely the pivoting axis PA.3 and the pivoting axis PA.4. Both pivoting axes PA.3, PA.4 are in the embodiment horizontal and are perpendicular to the conveying direction CD. The two brackets Br.l, Br.r determine the distance and angle over which the two bottoms CAB, PPB can be pivoted. Therefore the brackets Br.l, Br.r can be made as long as required.

Sometimes it is necessary to perform maintenance for the cutting assembly. The knives Kn.1, . . . , Kn.14 have to be grinded from time to time. A knife may be damaged by a rigid object, e.g. a stone, such that the damaged knife has to be replaced with a new knife. This maintenance work can only be performed if the knives are in a non-operating position.

The embodiment saves the need that a human operator has to creep under the cutting assembly for obtaining access to the knives Kn.1, . . . , Kn.14 of the cutting assembly. In contrast and according to the invention the cutting assembly can be shifted linearly and in a horizontal direction laterally out of the frame—like a drawer out of a cupboard. In the embodiment the moving direction (the lateral direction LD) is perpendicular to the travelling direction TD and to the conveying direction CD. The lateral direction can also be angularly oriented with respect to the conveying direction CD. A security device guarantees that the cutting assembly can only be shifted laterally if the rotor R and the pre-pressing unit do not rotate.

Thanks to the preferred embodiment of the invention it is possible but not necessary to lower down the knives Kn.1, . . . , Kn.14 with respect to the cutting area bottom CAB for performing maintenance while the knives Kn.1, . . . , Kn.14 are arranged below the frame of the baler. In contrast to lowering downwards the knives Kn. 1, . . . , Kn. 14, the entire cutting area including the cutting area bottom CAB with the longitudinal slots Sl.1, . . . , Sl.14 and the cutting assembly with the knives holder KnH and the knives Kn.1, . . . Kn.14 is shifted laterally in the lateral direction LD. This embodiment saves a step of releasing and pivoting the cutting assembly with respect to the cutting area bottom CAB. Unless the security device is actuated for releasing the cutting area bottom CAB, the cutting area bottom CAB and therefore the cutting assembly are locked such that they cannot be shifted laterally but can only be pivoted around the horizontal perpendicular axis.

To perform a maintenance operation the following sequence is performed:
- A. The cutting area bottom CAB together with the cutting assembly KnH, Kn.1, . . . , Kn.14 is lowered downwards by being pivoted around the axis PA.1. After lowering down it, the knives Kn.1, . . . , Kn.14 do no longer engage into the spaces between adjacent rigid tines of the rotor R. In the embodiment the knives Kn. 1, . . . , Kn. 14 are not pivoted with respect to the cutting area bottom CAB but still engage through the slots Sl. 1, . . . , Sl. 14 in the bottom CAB in the cutting area bottom CAB.
- B. The cutting area bottom CAB together with the cutting assembly KnH, Kn.1, . . . , Kn.14 is shifted laterally out of the frame—like a drawer out of a cupboard. The knives still engage through the slots.
- C. If necessary the knives holder KnH or all knives of a knives set or a single knife is pivoted with respect to the shifted cutting area bottom CAB such that the required maintenance operation can be performed.

After the maintenance operation is completed, the inverse steps are performed in the reverse sequence.

In one embodiment the knives position sensor checks if the knives are in the operating position and engage into the spaces between the rotor tines of the rotor R. The cutting area bottom CAB can only be pivoted laterally if the knives are in a non-operating position. A control unit processes signals from the knives position sensor. If this sensor detects that the knives are in the operating position and engage into the spaces between the rotor tines, the control unit inhibits that a locking device for the cutting area bottom CAB is released.

As mentioned above the entire cutting area bottom CAB including the cutting assembly can be shifted laterally. After having shifted the cutting area bottom CAB laterally with respect to the connecting assembly, a rectangular aperture in the bottom of the feeding channel occurs. This aperture is situated between the pick-up unit and the pre-pressing area bottom PPB and below the rotor R. Of course the baler cannot feed material through the feeding channel to the pressing chamber as long as this aperture occurs.

In order to enable this lateral and linear movement, the cutting area bottom CAB is arranged between a front guiding means and a rear guiding means. These two guiding means enable the lateral and linear movement as well as a pivotal movement of the cutting area bottom CAB with respect to the frame and to the connecting assembly. As mentioned above the lateral and linear movement is for maintenance purposes, whereas the pivotal movement of the both bottoms CAB, PPB is for preventing or removing a jam during normal conveying and cutting operation.

The front guiding means is connected with the frame. In one embodiment the front guiding means comprises a rail. This rail is mounted at the frame and extends perpendicular to the conveying direction CD. The rail may comprise several parts which are connected with each other like a telescope such that the length of the rail can be increased before shifting laterally the cutting area bottom CAB. Preferably the rail has a U-shaped profile. At least one wheel, preferably several wheels, are rotatably mounted at the front edge of the cutting area bottom CAB and can afterwards be decreased. These wheels roll in or on the rail. The wheels may be idler wheels or driven wheels. The rotational axes of these wheels are horizontal and are parallel to the travelling direction TD such that the wheel-rail arrangement guides the cutting area bottom CAB laterally and perpendicular to the travelling direction TD and inhibits a movement of the cutting area bottom CAB in the conveying direction CD or in the travelling direction TD.

FIG. 1 and FIG. 2 show a lower guiding rail GR.l and an inverted upper guiding rail GR.u. Both guiding rails GR.l, GR.u have a U shape. A left wheel W.l and a right wheel W.r can roll along the two guiding rails GR.l, GR.u and are carried by the lower guiding rail GR.l. The guiding rails GR.l, GR.u restricts the possible movements of the wheels W.l, W.r to a linear movement along the longitudinal axis of these guiding rails GR.l, GR.u in both directions and inhibits a relevant movement parallel to the conveying direction CD. This longitudinal axis is perpendicular to the drawing plane of FIG. 1 and lies in the drawing plane of FIG. 2. The upper guiding rail GR.u prevents the wheels W.l, W.r from pivoting around a horizontal axis perpendicular to the travelling direction TD. Both guiding rails GR.l, GR.u together prevents the wheels W.l, W.r from being shifted in the conveying direction CD or in the travelling direction TD.

The left wheel W.l can rotate around the left axle Ax.l. The right wheel W.r can rotate around the right axle Ax.r. Both axles Ax.l, Ax.r are guided through the cross bearing unit CrB.

In addition both axles Ax.l, Ax.r are guided through a traversal wheels holding bearing WHB. This traversal wheels holding bearing WHB keeps the distance between the two axles Ax.l, Ax.r constant. A left cross bearing holder CrBH.l and a right cross bearing holder CrBH.r connect the cross bearing unit CrB with the traversal wheels holding bearing WHB. The weight of the cutting area bottom CAB is carried by the two axles Ax.l, Ax.r.

The wheels W.1, W.r carry the axles Ax.l, Ax.r. The axles Ax.l, Ax.r carry the traversal wheels holding bearing WHB. The traversal wheels holding bearing WHB carries the two cross bearing holders CrBH.l, CrBH.r. The two cross bearing holders CrBH.l, CrBH.r pivotally carries the cross bearing unit CrB. The cross bearing unit CrB can rotate around the pivoting axis PA.1 with respect to the two cross bearing holders CrBH.l, CrBH.r. The wheel axles Ax.l, Ax.r do not extend to the cross bearing unit CrB.

Figure 4:
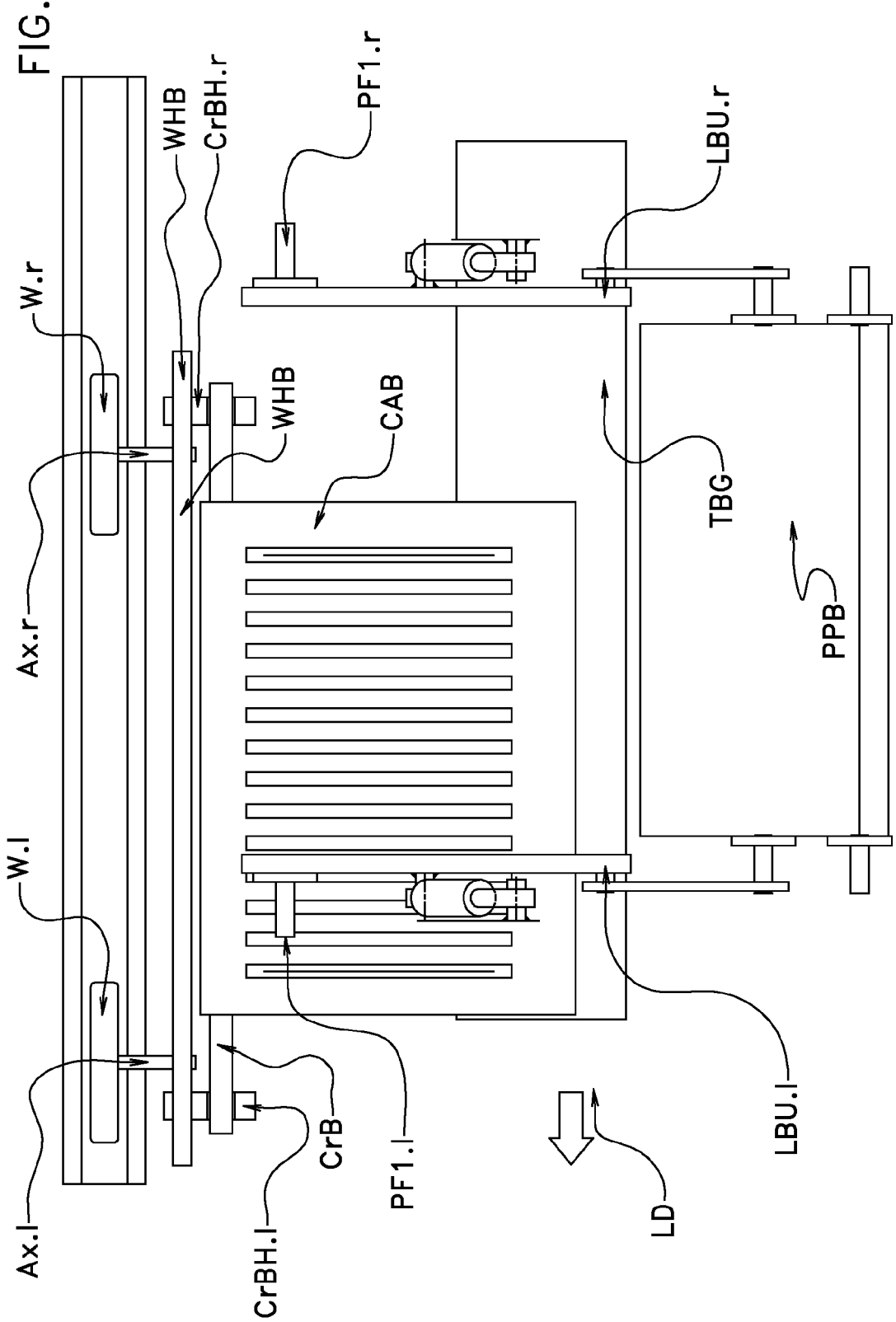
FIG. 4 shows the embodiment of FIG. 2 in a top view where the cutting area guiding surface is conveyed laterally with respect to the frame.

FIG. 4 shows in a top view the embodiment of FIG. 1 and FIG. 2 after the cutting area bottom CAB has been moved to the left in the lateral direction LD. During this linear and lateral movement to the left the following parts are moved laterally without changing their relative positions to each other:
  the cutting area bottom CAB with the slots Sl. 1, . . . , Sl. 14, the holders HC1.*l*, HC1.*r*, the knives holder KnH with the knives Kn.1, . . . , Kn.14, the cross bearing unit CrB which is pivotally connected with the cutting area bottom CAB via the holders HC1.*l*, HC1.*r*, the left cross bearing holder CrBH.l and the right cross bearing holder CrBH.r connecting the cross bearing unit CrB with the traversal wheels holding bearing WHB, the traversal wheels holding bearing WHB, the two axles Ax.l, Ax.r, and the two rotating wheels W.l, W.r.

To enable this linear movement neither the cross bearing unit CrB nor the wheels holding bearing WHB are directly connected with the frame. The connecting assembly LBU.l, LBU.r, TBG, the horizontal cylinders Cyl.l, Cyl.r and the pre-pressing area bottom PPB are not shifted, cf. FIG. 4 compared with FIG. 2.

In an alternative implementation of the front guiding means several wheels are rotatable mounted at the frame and carry the front edge of the cutting area bottom CAB or carry an inverted rail which is mounted at the lower surface of the cutting area button CAB. In a further embodiment an outer lateral area (left end area or right end area) of the cutting area bottom CAB is connected with a telescopic bearing which can be elongated along a horizontal axis being perpendicular to the travelling direction TD.

In one embodiment the cutting area bottom CAB together with the cutting assembly is shifted laterally and manually by a human operator. The operator pulls or pushes the cutting area bottom CAB. Preferably the cutting area bottom CAB comprises a handle. The wheels W.l, W.r are idler wheels. A spring may support the lateral movement. Preferably a locking mechanism keeps the cutting area button CAB in the central operating position as shown in FIG. 2 against the force of this spring. The human operator has to release the locking mechanism.

In a further embodiment some rollers are driven wheels. A motor rotate these rollers. The rotating wheels propel the lowered cutting area bottom CAB laterally.

In the embodiment of FIG. 1 to FIG. 4 it is possible to provide the two wheels W.l, W.r with a drive, e.g. one electrical motor per wheel. This drive rotates both wheels W.1, W.r around their rotating axes Ax.l, Ax.r. This rotation propels the wheels W.l, W.r and therefore the entire cutting area bottom CAB in the lateral direction LD to the left or to the right.

In yet a further implementation of the front guiding means the frame carries a rigid traversal bearing extending horizontally and perpendicular to the travelling direction TD. The cutting area bottom CAB together with the cutting assembly can be rotated around this traversal bearing as well as shifted along the longitudinal axis of this traversal bearing. The front area of the cutting area bottom CAB is pivotally and shiftable connected with this traversal bearing, e.g. by two holding elements with two apertures and two holding pins. The traversal bearing is rigidly connected with the frame. The traversal bearing is preferably guided through two apertures in the frame. The traversal bearing pivotally holds the cutting area bottom CAB. The cutting area bottom CAB can be shifted laterally along a path extending between two limiting parts. To extend the distance over which the cutting area bottom CAB can be shifted, the holding pins are mounted by means of two lateral distance providing units, e.g. two cantilever arms.

Figure 5:
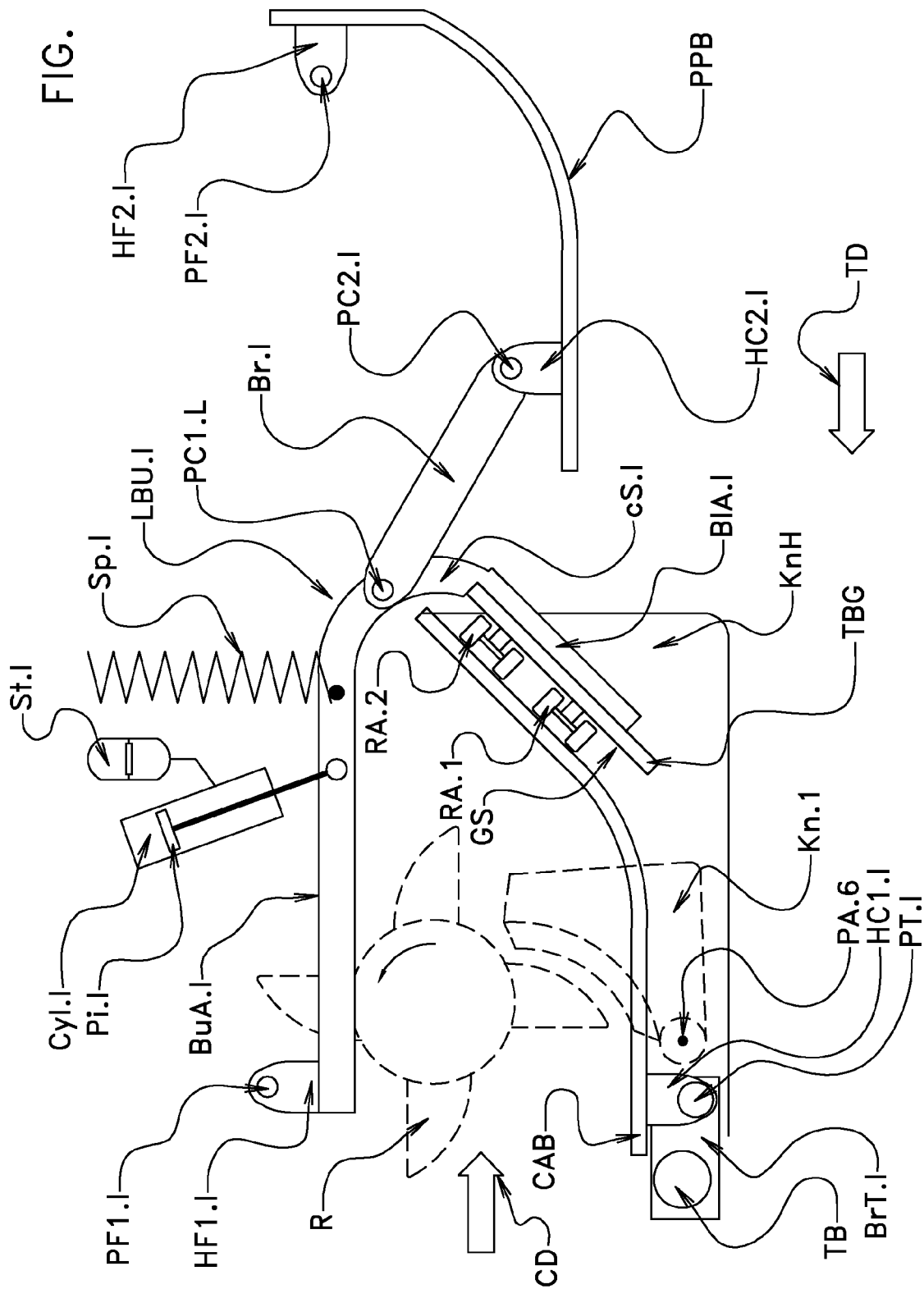
FIG. 5 shows a further embodiment of the conveying arrangement in a side view.
Figure 6:
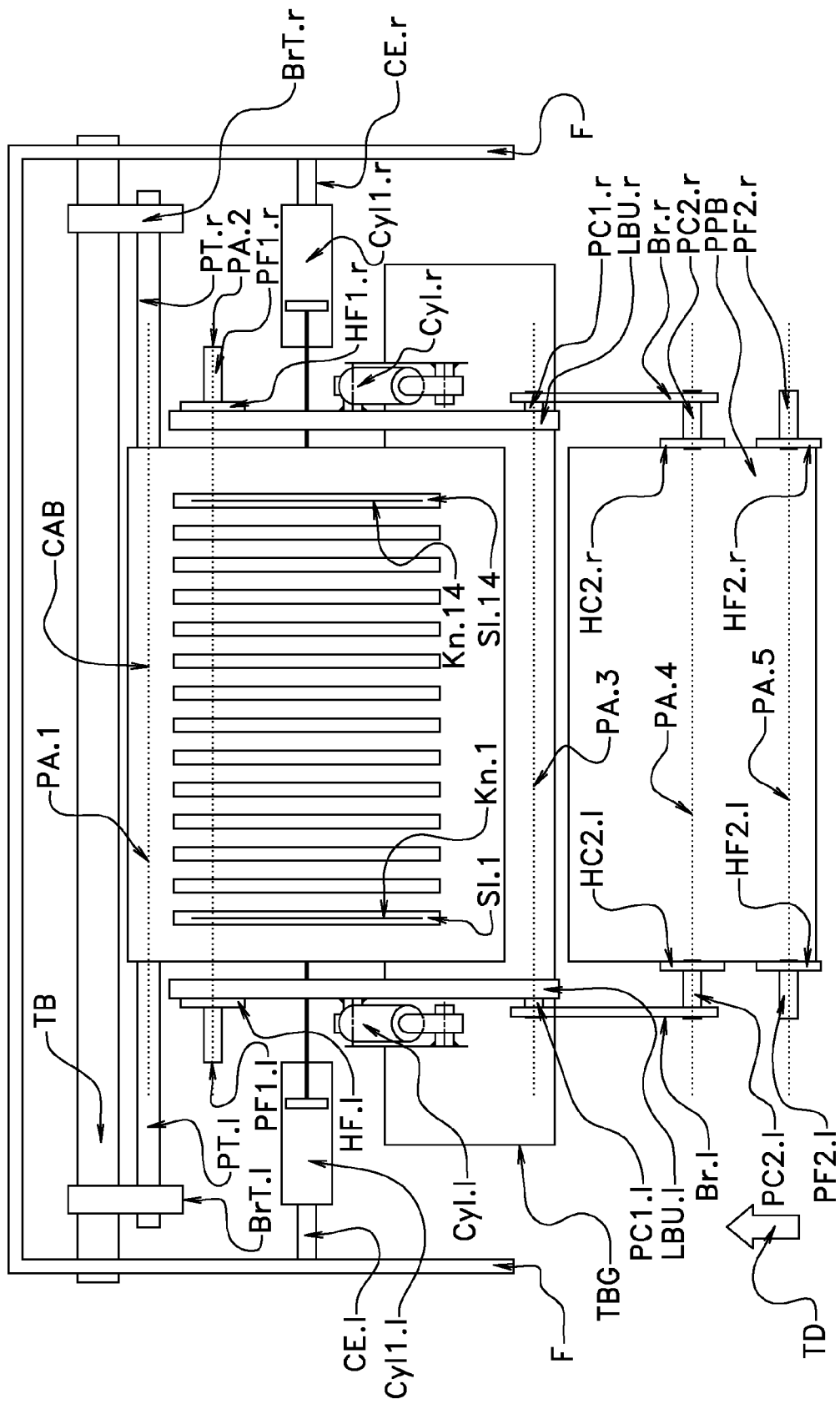
FIG. 6 shows the embodiment of FIG. 5 in a top view.

FIG. 5 and FIG. 6 show the embodiment with the traversal bearing TB which is rigidly connected with the frame of the baler. A left bracket BrT.l holds a left pin or a further bearing PT.l. A right bracket BrT.r holds a right pin or other bearing PT.r. The left pin PT.l is guided through an aperture in the left holder HC1.*l* rigidly mounted below the left-hand side of the cutting area bottom CAB. The right pin PT.r is guided through an aperture in the right holder HC1.*r* rigidly mounted below the right-hand side of the cutting area bottom CAB. The pivotal axis PA.1 of the cutting area bottom CAB equals the longitudinal axis of the traversal bearing TB. The two brackets BrT.l, BrT.r limit the path along which the cutting area bottom CAB can be shifted laterally. To extend this path the two pins PT.l, PT.r extend along their longitudinal axes in the lateral direction LD and are sufficiently long.

In this implementation the cutting area bottom CAB is guided laterally along the traversal bearing TB. This lateral movement may be performed manually by a human operator or by a horizontal positioning means. Such a horizontal positioning means is described below. Preferably the cutting area button CAB can laterally be shifted to the left as well as to the right such that every knife Kn.1, . . . , Kn.14 of the cutting assembly can be accessed by a lateral shift over not more than the half width of the cutting area button CAB.

The following description refers to the embodiment with the guiding rails GR.u, GR.l (FIG. 1 to FIG. 4) as well as to the embodiment with the traversal bearing TB (FIG. 5 and FIG. 6).

The rear guiding means for the cutting area bottom CAB is implemented by means of the traversal bearing and gliding unit TBG of the connecting assembly. The upper surface GS of this traversal bearing and gliding unit TBG yields an approximately flat guiding and gliding surface which is preferably sloping upwards seen in the conveying direction CD. Several wheels or balls mounted at the rear edge or adjacent to the rear edge of the cutting area bottom CAB roll along this upper surface GS. In an alternative embodiment the lower surface of the cutting area bottom CAB rolls over several rollers or balls mounted at the upper surface GS of the traversal bearing and gliding unit TBG. Therefore the upper surface GS operates as a gliding surface and as a guiding surface. These wheels or balls rolling over the surface of the guiding and gliding surface GS provide the only mechanical connection between the cutting area bottom CAB and the connecting assembly. This embodiment does not create an obstacle for pivoting or for shifting laterally the cutting area bottom CAB with respect to the connecting assembly. The wheels, however, provide a friction if a linear movement of the connecting assembly with respect to the cutting area bottom CAB in the travelling direction TD is performed.

All wheels—the wheels W.l, W.r at the front edge as well as the wheels at the rear edge of the cutting area bottom CAB—are situated below the cutting area bottom CAB such that the cutting area bottom CAB covers and protects the wheels and their rotating axes from being polluted by material conveyed through the feeding channel and falling downward.

In the figures a rigid traversal bearing and gliding unit TBG is shown. The upper surface of this rigid traversal bearing and gliding unit TBG is implemented as the gliding and gliding surface GS. The gliding surface GS is sloping upwards seen in the conveying direction CD. Two roller arrangements RA.1, RA.2 comprises a sequence of rollers or balls aligned in two lines. These lines of rollers or balls are both perpendicular to the drawing plane of FIG. 1, FIG. 3, and FIG. 5 and extend in the lateral direction LD. The cutting area bottom CAB can glide laterally along and above these roller arrangements RA.1, RA.2. Preferably the cutting area bottom CAB can also be shifted perpendicular to these two lines when being pivoted downwards and upwards. The roller arrangement RA.1, RA.2 can be mounted at the gliding and guiding surface GS or at the lower surface of the cutting area bottom CAB.

As mentioned above, the traversal bearing and gliding unit TBG and therefore also the guiding and gliding surface GS protrude to the left and/or to the right. In other words: The dimension of the traversal bearing and gliding unit TBG perpendicular to the conveying direction CD is greater than the distance between the two longitudinal bearing units LBU.l, LBU.r and therefore also greater than the width of the feeding channel with the bottoms CAB, PPB. Therefore the traversal bearing and guiding unit TBG supports the cutting area bottom CAB before and also after the cutting area bottom CAB was shifted laterally.

In both embodiments the cutting area bottom CAB is connected with the connecting assembly by means of these roller arrangements RA.1, RA.2 and the surface GS but is not connected by means of brackets or pins. No mechanical element needs to be released before shifting laterally the cutting area bottom CAB.

In one embodiment the cutting area bottom CAB can be shifted laterally to the left as well as to the right. The situation after having shifted the cutting area bottom CAB to the right is similar to the situation shown in FIG. 4. This embodiment enables a shorter guiding means for the lateral shift. It suffices shifting the cutting area bottom CAB slightly more than half of the entire width of the cutting area bottom CAB to the left or to the right to be able to access every knife of the cutting assembly.

In an alternative embodiment the cutting area bottom CAB can only be shifted laterally to the left or only to the right.

In one embodiment the cutting assembly comprehends two modules each having several knives. By this a left module and a right module are formed. The two cutting assembly modules can be connected with each other and can be disconnected, e.g. by means of locking arrangement comprising two hooks, corresponding protrusions and a hook lifting and lowering means. During normal operation the two modules are connected with each other. In order to perform a maintenance operation the two modules are disconnected and released. The left module is shifted linearly to the left and/or the right module is shifted to the right. In an alternative embodiment the knives arrangement comprises one frame carrying all knives Kn.1, . . . , Kn.14 and the pivoting cylinder(s).

During normal operation the cutting area bottom CAB is locked in its center position such that the cutting area bottom CAB can be pivoted downwards and upwards by the positioning means Cyl.l, Cyl.r but cannot be shifted laterally. For performing a maintenance operation the cutting area bottom CAB is released such that it can be shifted laterally. Preferably the operator actuates a button for releasing the cutting area bottom CAB. The cutting area bottom CAB together with the cutting assembly can be pulled out of the frame manually.

In one embodiment a horizontal positioning means may support this lateral movement of the cutting area bottom CAB in the lateral direction LD. This horizontal positioning means may comprise a motor which propels the wheels of the front guiding means and/or of the rear guide means for the cutting area bottom CAB. A further implementation of this horizontal positioning means can be combined with the horizontal traversal bearing TB as shown in FIG. 5 and FIG. 6 and can also be integrated into the embodiment of FIG. 1 to FIG. 4.

The horizontal positioning means may comprise at least one cylinder which can move an object to the left as well as to the right, i.e. the cylinder operates in a double-acting manner. The horizontal positioning means is connected with the frame and with the cutting area bottom CAB.

In one implementation a left lateral cantilever element is mounted at the left side of the frame and a right lateral cantilever element is mounted at the right side. For shifting the cutting area bottom CAB to the left a left cylinder Cyl1.*l* or a left spring being part of the horizontal positioning means shifts the cutting area bottom CAB towards the left lateral cantilever element. The left cylinder Cyl1.*l* or spring is connected with this left lateral cantilever element. A right cylinder Cyl1.*r* or a right spring connected with the right lateral cantilever element shifts the cutting area bottom CAB towards the right lateral cantilever element. This implementation enables a stable mechanism for shifting laterally the cutting area bottom CAB. The lateral movement of the cutting area bottom CAB, however, is restricted to the range between the two lateral cantilever elements. The distance between the two horizontal cylinders Cyl1.*l*, Cyl1.*r* limits the way of the cutting area bottom CAB.

The top view of FIG. 6 shows the embodiment with the traversal bearing TB. A left horizontal cylinder Cyl1.*l* is mounted at the frame (left side of the horizontal cylinder Cyl1.*l*) and at the left side of the cutting area bottom CAB (right side of the horizontal cylinder Cyl1.*l*). A right horizontal cylinder Cyl1.*r* is mounted at the frame (right side of the horizontal cylinder Cyl1.*r*) and at the right side of the cutting area bottom CAB (left side of the horizontal cylinder Cyl1.*r*). The left cantilever element CE.l connects the left horizontal cylinder Cyl1.*l* with the frame. The right cantilever element CE.r connects the right horizontal cylinder Cyl1.*r* with the frame. In FIG. 5 the horizontal cylinders Cyl1.*l*, Cyl1.*r* and the cantilever elements CE.l, CE.r are omitted for sake of clarity. The two horizontal cylinders Cyl1.*l*, Cyl1.*r* can shift the cutting area bottom CAB laterally to the left or to the right.

It is also possible to provide the embodiment of FIG. 1 to FIG. 4 with such a horizontal positioning means, e. g. with two vertical cylinders Cyl1.*l*, Cyl1.*r*.

In the two implementations just sketched the cutting area bottom CAB can be shifted with respect to the left and/or to the right with respect to the frame and with respect to the connecting assembly. In an alternative embodiment these implementations can be used to shift the cutting assembly KnH, Kn.1, . . . , Kn.14 laterally with respect to the cutting area bottom CAB. Before shifting the cutting assembly it is necessary to pivot the knives Kn.1, . . . , Kn. 14 out of the longitudinal slots Sl.1, . . . , Sl. 14.

In one implementation of this alternative embodiment at least one wheel, preferably two wheels W.l, W.r or two front wheels and two rear wheels, are pivotally connected with the cutting assembly. At least one guiding rail, preferably two guiding rails GR.l, GR.u, are mounted below the cutting area bottom CAB such that the guiding rails extend perpendicular to the conveying direction CD. The wheels roll along these guiding rails.

In one implementation at least one horizontal positioning means supports the lateral movement of the cutting assembly KnH, Kn.1, . . . , Kn.14 with respect to the cutting area bottom CAB. This horizontal positioning means can comprise a drive for rotating at least one wheel mounted at the cutting assembly, e.g. an electrical motor. The horizontal positioning means can also comprise at least one horizontal hydraulic cylinder, preferably a left hydraulic cylinder Cyl.l and a right hydraulic cylinder Cyl.r. The or every horizontal hydraulic cylinder is mounted with one side at the cutting area bottom CAB or at the frame and with the other side and the cutting assembly.

Reference signs used in the claims will do not limit the scope of the claimed invention. The term "comprises" does not exclude other elements or steps. The articles "a", "an", and "one" do not exclude a plurality of elements. Features specified in several depending claims may be combined in an advantageous manner.

LIST OF REFERENCE SIGNS

| | |
|---|---|
| Ax.l | axle of left idle wheel W.l |
| Ax.r | axle of right idle wheel W.l |
| BlA.l | left lower arm of the left longitudinal bearing unit LBU.l |
| BlA.r | right lower arm of the right longitudinal bearing unit LBU.r |
| Br.l | left bracket of connecting assembly |
| Br.r | right bracket of connecting assembly |
| BrT.l | left bracket in second embodiment, connected with the traversal bearing TB, carries the left pin PT.l |
| BuA.l | left upper arm of longitudinal bearing unit |
| BuA.r | right upper arm of longitudinal bearing unit |
| CAB | cutting area bottom; serves as the cutting area guiding surface |
| CD | conveying direction of the conveying assembly |
| CE.l | left cantilever element; connects the left horizontal cylinder Cyl1.l with the frame |
| CE.r | right cantilever element; connects the right horizontal cylinder Cyl1.r with the frame |
| CrB | traversal cross bearing unit, carries both axles Ax.l and Ax.r |
| Cyl.l | left vertical cylinder for lifting up and lowering down the connecting assembly |
| Cyl.r | right vertical cylinder for lifting up and lowering down the connecting assembly |
| Cyl1.l | left horizontal cylinder, pulls and pushes the cutting area bottom CAB |
| Cyl1.r | right horizontal cylinder, pulls and pushes the cutting area bottom CAB |
| cS.l | left connecting stub between the left upper arm BuA.l and left lower arm BlA.l |
| cS.r | right connecting stub between the left upper arm BuA.l and left lower arm BlA.l |
| F | frame of the baler |
| GR.l | lower guide rail, guides the wheels W.l, W.r from below |
| GR.u | upper guide rail, guides the wheels W.l, W.r from above |
| GS | gliding surface of the traversal bearing and gliding unit TBG |
| HC1.l | left holder of the cutting area bottom CAB, is connected with the cross bearing unit CrB |
| HC1.r | right holder of the cutting area bottom CAB, is connected with the cross bearing unit CrB |
| HC2.l | second left holder of connecting assembly, carries the pre-pressing area bottom PPB |
| HC2.r | second right holder of connecting assembly, carries the pre-pressing area bottom PPB |
| HF1.l | first left frame-connected holder, carries the longitudinal bearing unit at the left upper arm BuA.l |
| HF1.r | first right frame-connected holder, carries the longitudinal bearing unit at the left upper arm BuA.l |
| HF2.l | second left frame-connected holder, carries the pre-pressing area bottom PPB |
| HF2.r | second right frame-connected holder, carries the pre-pressing area bottom PPB |
| CrBH.l | left cross bearing holder, carries the cross bearing unit CrB |
| CrBH.r | right cross bearing holder, carries the cross bearing unit CrB |
| KnH | knives holder of the cutting assembly, carries the knives Kn.1, . . . , Kn.14 |
| Kn.1 . . . , Kn.14 | knives of the cutting assembly, penetrates the longitudinal slots Sl.1 . . . , Sl.14 |
| LBU.l | left longitudinal bearing unit, comprises the left upper arm BuA.l, the left connecting stub cS.l, and the left lower arm BlA.l |
| LBU.r | right longitudinal bearing unit, comprises the right upper arm BuA.r, the right connecting stub cS.r, and the right lower arm BlA.r |
| LD | lateral direction in which the cutting area bottom CAB can be shifted |
| PA.1 | first pivoting axis, front pivoting axis of the cutting area bottom CAB |
| PA.2 | second pivoting axis, front pivoting axis of the longitudinal bearing |
| PA.3 | third pivoting axis, rear pivoting axis of the longitudinal bearing and front pivoting axis of the brackets Br.l, Br.r |
| PA.4 | fourth pivoting axis, front pivoting axis of the pre-pressing area bottom PPB and rear pivoting axis of the brackets Br.l, Br.r |
| PA.5 | fifth pivoting axis, rear pivoting axis of the pre-pressing area bottom PPB |
| PA.6 | rotating axis around which the knives Kn.1 . . . , Kn.14 can be pivoted with respect to the knives holder KnH |
| PC1.l | first left pin of the connecting brackets, connects the left bracket Br.l with the left connecting stub CS.l |
| PC1.r | first right pin of the connecting brackets, connects the right bracket Br.r with the right connecting stub CS.r |

-continued

| | |
|---|---|
| PC2.l | second left pin of the connecting brackets, connects the left bracket Br.l with the second left holder HC2.l |
| PC2.r | second right pin of the connecting brackets, connects the right bracket Br.r with the second right holder HC2.r |
| PF1.l | first left frame-mounted pin, connects the first left frame-connected holder HF1.l with the frame |
| PF1.r | first right frame-mounted pin, connects the first right frame-connected holder HF1.l with the frame |
| PF2.l | second left frame-mounted pin, connects the second left frame-connected holder HF2.l with the frame |
| PF2.r | second right frame-mounted pin, connects the second right frame-connected holder HF2.l with the frame |
| Pi.l | piston of the left vertical cylinder Cyl.l |
| Pi.r | piston of the right vertical cylinder Cyl.r |
| PPB | pre-pressing area bottom, serves as the further surface |
| PT.l | left pin connected with the left bracket BrT.l |
| PT.r | right pin connected with the right bracket BrT.r |
| R | rotor with stiff tines |
| RA.1, RA.2 | roller arrangement for guiding the cutting area bottom CAB |
| Sl.1 . . . Sl.14 | longitudinal slots in the cutting area bottom CAB for the knives |
| Kn.1 . . . , Kn.14 | |
| Sp.l | left spring of a retaining mechanism, carries the left upper arm BuA.l |
| Sp.r | right spring of a retaining mechanism, carries the right upper arm BuA.r |
| St.l | left oil storage |
| TB | traversal bearing |
| TBG | traversal bearing and gliding unit |
| TD | travelling direction of the baler |
| W.l | left idle wheel for guiding the cutting area bottom CAB, rotates around the left axle Ax.l |
| W.r | right idle wheel for guiding the cutting area bottom CAB, rotates around the right axle Ax.r |
| WHB | traversal wheels holding bearing, is carried by two axles Ax.l, Ax.r, carries the two cross bearing holding bearings CrBH.l, CrBH.r |

The invention claimed is:

1. An arrangement comprising:
a material processing arrangement; and
a feeding arrangement, the feeding arrangement comprising a frame and a conveying arrangement for conveying loose material in a conveying direction to the material processing arrangement,
wherein the material processing arrangement is configured to process material being fed to the material processing arrangement, and
wherein the conveying arrangement is connected with the frame, and comprises:
a cutting assembly with several knives;
a conveying assembly;
a cutting area guiding surface;
a further guiding surface;
a connecting assembly; and
a positioning mechanism,
wherein the cutting assembly extends from below the cutting area guiding surface and penetrates through the cutting area guiding surface and is mechanically connected with the cutting area guiding surface,
wherein the conveying assembly is arranged for conveying loose material in the conveying direction and above and along the cutting area and above and along the further guiding surfaces and for cooperating with the knives for cutting conveyed material,
wherein the cutting area guiding surface with the cutting assembly is pivotally connected with the frame such that the cutting area guiding surface is pivotable with respect to the frame upwards and downwards,
wherein the further guiding surface is pivotably connected with the frame such that the further guiding surface is pivotable with respect to the frame upwards and downwards,
wherein the connecting assembly is arranged between the cutting area guiding surface and the further guiding surface, implements a mechanical connection between the cutting area guiding surface and the further guiding surface such that the cutting area guiding surface with the cutting arrangement is pivotable clockwise and anti-clockwise with respect to the further guiding surface, and mechanically supports the two guiding surfaces in a way that both guiding surfaces are pivotable with respect to the frame upwards and downwards,
the positioning mechanism is connected with the frame and with the connecting assembly, holds the connecting assembly in a position with respect to the frame and is adapted for moving the connecting assembly in an upward direction and in a downward direction,
wherein the conveying arrangement is arranged such that a movement of the connecting assembly in the upward direction causes the cutting area and the further guiding surfaces to pivot upwards with respect to the frame, and a movement of the connecting assembly in the downward direction causes the cutting area and the further guiding surfaces to pivot downwards with respect to the frame, and
wherein the cutting assembly is operable to move laterally with respect to the connecting assembly in at least one lateral direction which is perpendicular or angular to the conveying direction.

2. The arrangement according to claim 1, wherein the cutting area guiding surface is pivotable with respect to the frame around a pivoting rotating axis which is perpendicular to the conveying direction and the further conveying surface is pivotable with respect to the frame around a further pivoting axis, which is also perpendicular to the conveying direction.

3. The arrangement according to claim 1, wherein at least one guiding surface is pivotally connected with the connecting assembly such that the pivotally connected guiding surface is pivotable with respect to the connecting assembly around a pivoting axis, which is perpendicular or angular to the conveying direction.

4. The arrangement according to claim 1, wherein the cutting area guiding surface is connected with the frame and with the connecting assembly such that the cutting area guiding surface together with the cutting assembly is operable to be shifted in the lateral direction with respect to the frame and with respect to the connecting assembly.

5. The arrangement according to claim 4, wherein the conveying arrangement further comprises a guide arranged for guiding the cutting area guiding surface along the lateral direction, while the cutting area guiding surface is shifted in the lateral direction.

6. The arrangement according to claim 5, wherein the guide comprises a rail system, the rail system extending in the lateral direction and being mounted at the frame,
wherein the cutting area guiding surface is mechanically connected with at least one wheel, the at least one wheel rolling in or on the rail system and being rotatably connected with the cutting area guiding surface, and
wherein the cutting area guiding surface is mounted such that it is pivotable with respect to the rail system.

7. The arrangement according to claim 5, wherein the guide comprises a traversal beam mechanically connected with the frame, the traversal beam extending in the lateral direction in which the cutting area guiding surface is operable to be shifted with respect to the frame and carrying the cutting area guiding surface, and
wherein the conveying arrangement is arranged such that the cutting area guiding surface is operable to be shifted along the traversal beam and is pivotable around the traversal beam.

8. The arrangement according to claim 4, wherein the connecting assembly comprises a traversal bearing and gliding unit with a gliding surface, the traversal bearing and gliding unit supporting the cutting area guiding surface from below such that the cutting area guiding surface is operable to glide laterally along the gliding surface in the lateral direction.

9. The arrangement according to claim 8, wherein the connecting assembly comprises two longitudinal bearing units extending in the conveying direction and being rigidly connected by the traversal bearing and gliding unit.

10. The arrangement according to claim 1,
wherein the cutting assembly is pivotally mounted at the cutting area guiding surface such that the cutting assembly is pivotable into an operating position and into a non-operating position with respect to the cutting area guiding surface around a pivoting axis which is perpendicular to the conveying direction, and
wherein in the operating position the knives penetrate the longitudinal slots and in the non-operating position the knives are entirely below the cutting area guiding surface.

11. The arrangement according to claim 1, wherein the connecting assembly comprises two longitudinal bearing units extending in the conveying direction,
wherein the cutting area guiding surface is arranged between these two longitudinal bearing units such that seen in the conveying direction a left longitudinal bearing unit and a right longitudinal bearing unit are formed, and
wherein the positioning mechanism is mechanically connected with at least one longitudinal bearing unit.

12. The arrangement according to claim 11, wherein the positioning mechanism comprises a left cylinder and a right cylinder, the left cylinder being connected with the left longitudinal bearing unit, and the right cylinder being connected with the right longitudinal bearing unit.

13. The arrangement according to claim 1, wherein the conveying arrangement comprises a retaining mechanism, the retaining mechanism being connected with the frame and being connected with the connecting assembly, the retaining mechanism being adapted for moving the connecting assembly against the force of gravity in the upward direction.

14. The arrangement according to claim 1, wherein the cutting area guiding surface comprises several longitudinal slots extending in the conveying direction,
wherein the cutting assembly comprises a knives holder for holding the knives, the knives holder being mounted below the cutting area guiding surface,
wherein the knives penetrate the longitudinal slots in the cutting area guiding surface when the knives are in an operating position, and
wherein the conveying assembly is arranged for pressing material through spaces between the knives penetrating the slots.

15. The arrangement according to claim 1, wherein the conveying arrangement further comprises a cutting assembly shifting member, the cutting assembly shifting member being mechanically connected with the frame and being adapted for shifting the cutting assembly with respect to the frame in the lateral direction.

16. The arrangement according to claim 15, wherein the cutting area guiding surface is operable to be shifted with respect to the further guiding surface in the lateral direction while carrying the cutting assembly and
wherein the guiding surface shifting member is adapted for shifting the cutting area guiding surface together with the cutting assembly in the lateral direction.

17. A vehicle for processing loose material lying on the ground, the vehicle being adapted for moving over the ground, the vehicle comprising:
a pick-up unit for picking up loose material from the ground; and
the arrangement according to claim 1,
wherein the feeding arrangement is adapted for feeding picked-up loose material to the processing arrangement and for cutting picked-up loose material.

* * * * *